United States Patent
Nickerson

(10) Patent No.: US 10,528,604 B2
(45) Date of Patent: Jan. 7, 2020

(54) METHODS AND SYSTEMS FOR TRACKING THE FLOW OF TRUCKING FREIGHT AND/OR OTHER ASSETS USING MOBILE DEVICE GEOLOCATION DATA

(71) Applicant: Sunrise Opportunities, LLC, Harvard, MA (US)

(72) Inventor: Kenneth S. Nickerson, Harvard, MA (US)

(73) Assignee: Sunrise Opportunities, LLC, Harvard, MA (US)

( * ) Notice: Subject to any disclaimer, the term of this patent is extended or adjusted under 35 U.S.C. 154(b) by 0 days.

(21) Appl. No.: 15/884,175

(22) Filed: Jan. 30, 2018

(65) Prior Publication Data

US 2019/0236165 A1    Aug. 1, 2019

(51) Int. Cl.
| | |
|---|---|
| *G06Q 10/08* | (2012.01) |
| *G06F 16/29* | (2019.01) |
| *G01S 19/13* | (2010.01) |
| *H04W 64/00* | (2009.01) |

(52) U.S. Cl.
CPC .............. *G06F 16/29* (2019.01); *G01S 19/13* (2013.01); *G06Q 10/08* (2013.01); *H04W 64/00* (2013.01)

(58) Field of Classification Search
None
See application file for complete search history.

(56) References Cited

U.S. PATENT DOCUMENTS

| | | |
|---|---|---|
| 9,571,983 B1 | 2/2017 | Li et al. |
| 10,387,822 B1 * | 8/2019 | Bolton ............... G06Q 10/0835 |
| 2013/0030873 A1 | 1/2013 | Davidson |
| | | (Continued) |

FOREIGN PATENT DOCUMENTS

| | | |
|---|---|---|
| JP | 2018500216 A | 1/2018 |
| WO | WO-2019/152389 A1 | 8/2019 |

OTHER PUBLICATIONS

Young-Ji Byon, Jun Su Ha, Chung-Suk Cho, Tae-Yeon Kim, and Chan Yeob Yeun, Real-Time Transportation Mode Identification Using Artificial Neutal Networkd Enhanced with Mode Availability Layers: A Case Study in Dubai, Sep. 8, 2017, pp. 1-17.*

(Continued)

*Primary Examiner* — Thu N Nguyen
(74) *Attorney, Agent, or Firm* — William R. Haulbrook; Michael D. Schmitt; Choate, Hall & Stewart LLP

(57) ABSTRACT

Presented herein are systems, methods, and architectures related to the use of mobile device geolocation data to infer and record specific detailed freight movements. In certain embodiments, using mobile device geolocation data, a freight movement database is created which may contain thousands of records each day describing in detail inferred individual freight movements. For example, each record in a freight movement database may contain information about origins, stops, and/or destinations such as dates, times, and locations of freight stops and movements. In certain embodiments, mobile device geolocation is used to create, maintain, and use a freight movement database. Such a freight movement database fills an important need in the industry because of the current lack of comprehensive and reliable information related to freight movements.

30 Claims, 10 Drawing Sheets

(56) References Cited

U.S. PATENT DOCUMENTS

| | | | |
|---|---|---|---|
| 2013/0345971 A1* | 12/2013 | Stamm | H04W 4/029 |
| | | | 701/465 |
| 2015/0339624 A1* | 11/2015 | Lozito | G06Q 10/0833 |
| | | | 705/333 |
| 2017/0031963 A1 | 2/2017 | Merz et al. | |
| 2017/0200197 A1 | 7/2017 | Brubaker | |
| 2017/0230797 A1* | 8/2017 | Lauterbach | H04W 4/046 |

OTHER PUBLICATIONS

Byon, Y-J. et al., Real-Time Transportation Mode Detection via Tracking Global Positioning System Mobile Devices, Jounal of Intelligent Transportation Systems, 13(4)161-170 (2009).

Byon, Y-J. et al., Real-Time Transportation Mode Identification Using Artificial Neural Networks Enhanced with Mode Availability Layers: A Case Study in Dubai, Applied Sciences, 7(923):1-17 (2017).

Cich, G. et al., TRIP/STOP Detection in GPS Traces to Feed Prompted Recall Survey, 6th International Conference on Ambient Systems, Networks and Technologies (ANT 2015), ScienceDirect, Proecedia Computer Science, 52:262-269 (2015).

Cintia, Paolo, Ph.D. Thesis, Knowledge and Discovery through Mobility Data Integration, Università Degli Studi Di Pisa, pp. 1-143 (2015).

Furletti, B. et al., Inferring human activities from GPS tracks, UrbComp 2013, ACM 978-1-4503-2331-4/Apr. 13, 2008.

International Search Report, Application No. PCT/US2019/015627 (Methods and Systems for Tracking the Flow of Trucking Freight and/or Other Assets Using Mobile Device Geolocation Data, filed Jan. 29, 2019), issued by ISA/European Patent Office, 3 pages, dated Apr. 16, 2109.

Written Opinion, International Search Report, Application No. PCT/US2019/015627 (Methods and Systems for Tracking the Flow of Trucking Freight and/or Other Assets Using Mobile Device Geolocation Data, filed Jan. 29, 2019), issued by ISA/European Patent Office, 5 pages, dated Apr. 16, 2109.

* cited by examiner

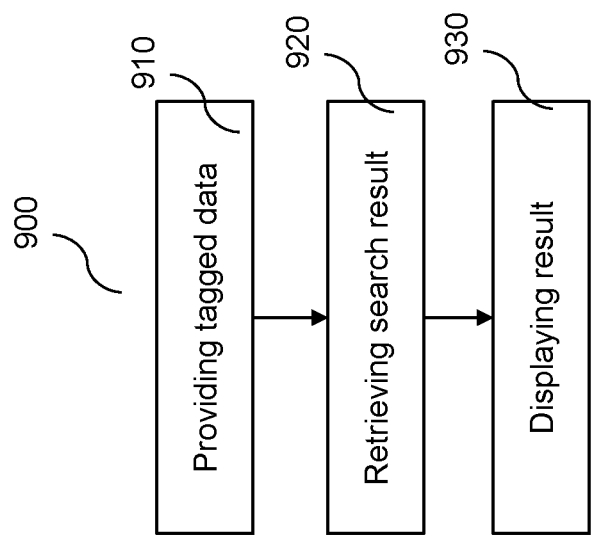

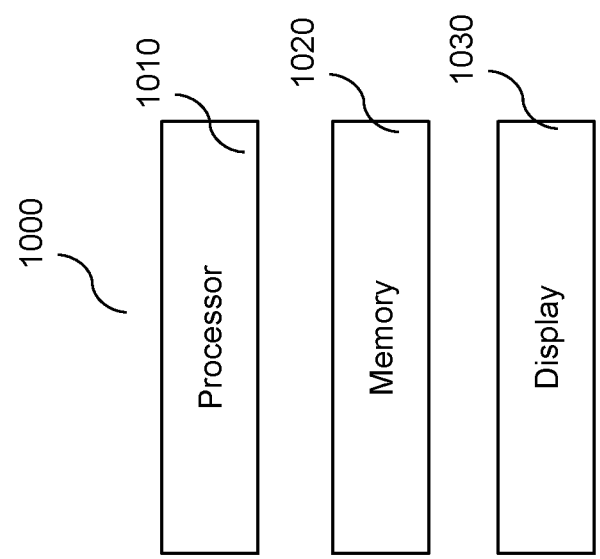

METHODS AND SYSTEMS FOR TRACKING THE FLOW OF TRUCKING FREIGHT AND/OR OTHER ASSETS USING MOBILE DEVICE GEOLOCATION DATA

FIELD

This invention relates generally to methods and systems for operating a freight movement data management platform for analyzing freight movements. In certain embodiments, the methods and systems described herein may be used for tracking the flow of trucking freight and/or other assets using mobile device geolocation data.

BACKGROUND

Over 85% of all working age adults now own smartphones in the United States (U.S.). Essentially all mobile devices (e.g., mobile phone devices, e.g., smartphones) can accurately track location using GPS chips. Many applications (apps) on mobile devices make use of this location data to provide their services. Terms of use for many of these applications allow the application to capture information about usage including location data, and to use and resell this mobile device geolocation data. As a result, it is now possible to purchase mobile device geolocation data from cell phones. In the US, these data are available for well over 10% of all smartphones, and coverage is steadily increasing. Global availability of mobile device geolocation data is also growing rapidly.

FIG. 6 shows an illustrative example 600 of the flow of mobile device geolocation data from a GPS chip of a mobile device to a company. GPS chip 620 determines the position of a mobile device based on signals received from GPS satellites 610. Smartphone App 630 can use this information to provide services to a user of the mobile device. A company (e.g., a data broker, e.g., a telecommunications company, e.g., a technology company) 640 can acquire this location data from multiple mobile devices and offer it for sale.

Mobile device geolocation data can also be obtained from the triangulation of signals from telecommunications towers (e.g., cellular towers) and known locations of WIFI spots. GPS chips can provide significantly more accurate tracking of device location than is possible using other means such as by triangulating device positions from network-based telecommunications data based on signal intensities measured at multiple cellular towers. For example, FIG. 7 shows an illustrative example 700 of the triangulation of a position for mobile device 710 based on signal strengths at telecommunication towers 720.

Mobile device geolocation data typically includes a unique device identifier (UID) for each mobile device along with a sequence of device positions (e.g., latitude and longitude pairs), each with a corresponding timestamp. Generally, geolocation data may include additional information such as a UID type, a source identifier, a device type, and an accuracy. Mobile device geolocation data are collected at a wide range of frequencies, from seconds to minutes to hours depending on the source. Some sources (e.g., smartphone Apps, e.g., software development kits (SDKs), e.g., operating systems) use irregular frequencies to minimize battery usage. For example, new location pings may only be generated when a user opens a given App or begins to move and/or settles in a new location.

The commercial use of mobile device geolocation data is growing. However, commercially available analysis has currently been limited to applications such as counting customers at business locations and estimating the characteristics of vehicle traffic.

In both the U.S. and the Europe, approximately 70% of all freight is carried by truck. Currently, no comprehensive granular (e.g., detailed) data are available about this freight movement anywhere for any price. This data is not presently available because there are no detailed reporting requirements for trucking freight movements, and the trucking industry is highly fractured thereby diffusing the data across thousands of companies. Consequently, industrial freight movement, a critical precursor and indicator of company and customer economic activity, remains obscure at all but the most macro levels. No current method exists to accurately measure freight movement.

In the US, approximately half of all freight is transported by "private carriers". Private carriers are companies in businesses other than trucking that move their own freight in their own trucks. There are private carriers in essentially any industry which moves freight. There are so few reporting requirements for this type of freight movement that it is completely ignored in the U.S. government's Economic Census produced every 5 years and in its annual Economic Survey. Company-specific historical data, let alone real-time company specific data, are unavailable.

For-hire carriers are companies whose primary business is selling trucking services. For-hire carriers can be segmented into many sub-industries such as: package carriers, truckload (TL) carriers, less-than-truckload (LTL) carriers, drayage carriers, and specialty carriers (e.g., carriers using refrigerated trucks, flatbed trucks, trucks for transporting motor vehicles, trucks for transporting household goods, or the like). Except for package carriers—which are largely dominated by large corporate entities—each of these sub-industries is highly fractured and has many competing companies. Some sub-industries such as truckload carriers have individual owner-operators and very small companies that successfully compete in the marketplace and represent a significant portion of the sub-industry. While some historical macro information can be obtained about different sub-industries and some information can be learned from public carriers, no detailed or real-time information about freight movement is available in the marketplace.

Most attempts at providing real-time monitoring of freight movement require freight operators to install dedicated tracking devices on each truck. However, this approach is costly, and companies are very reluctant to share this data with third parties. Freight vehicle traffic can potentially be estimated from telecommunications data acquired from telecommunications towers (e.g., from estimated cellphone positions based on signal triangulation between cell towers such as that depicted in FIG. 7). However, telecommunications data provide very low-accuracy estimates of cellphone positions. Positions estimated from telecommunications data are generally only accurate to within the area of a zip code. Because of their low accuracy, positions derived from telecommunications data cannot be used for analysis beyond gross estimates of regional traffic. Therefore, there exists a need for improved systems and methods for monitoring the movement of freight.

SUMMARY

Presented herein are systems, methods, and architectures related to the use of mobile device geolocation data to infer and record specific detailed freight movements. In certain embodiments, using mobile device geolocation data, a freight movement database is created which may contain thousands of records each day describing in detail inferred individual freight movements. For example, each record in a freight movement database may contain information about origins, stops, and/or destinations such as dates, times, and locations of freight stops and movements. In certain embodiments, mobile device geolocation data are used to create, maintain, and use a freight movement database. Such a freight movement database fills an important need in the industry because of the current lack of comprehensive and reliable information related to freight movements.

An illustration of the kinds of records in a freight movement database, according to certain embodiments, is as follows:
- a truckload truck from company X left a tractor warehouse for company Y near Portland, Oreg. at approximately 10:30 am Aug. 20, 2017 and ended at a warehouse for company Z near San Francisco, Calif. on Aug. 21, 2017 around 2:45 pm likely carrying tractors;
- a drayage truck from company X left the Seattle Port at approximately 11:15 am on Aug. 20, 2017 and drove to a warehouse for company Y in Renton, Wash. arriving around 1:15 pm on Aug. 20, 2017 likely carrying consumer products;
- an automotive truck from company X left an automobile facility for company Y in Newark, N.J. at approximately 8:30 am on Aug. 20, 2017 and made stops at dealerships for company Y in Hartford, Conn. at 1:30 pm, Framingham, Mass. at 3:30 pm, and Boston, Mass. at 5:15 pm likely carrying cars;
- a delivery truck for company Y left a warehouse for company Y in Memphis, Tenn. at 3:30 am on Aug. 20, 2017 and drove to the warehouse for company Y outside of Little Rock, Ark. arriving at 6:00 am likely carrying parcels.

In certain embodiments, a freight movement database is constructed and/or maintained by applying easily understood heuristics, such as those described herein, to mobile device geolocation data in order to identify, for example, freight movements, operator characteristics, and the like. Artificial intelligence modules (e.g., statistical methods, e.g., machine learning techniques, e.g., artificial intelligence techniques, e.g., pattern-recognition methods) are used, in certain embodiments, to identify and characterize patterns in large sets of mobile device geolocation data. Additionally, a freight movement database, for example, can be created, maintained, and/or updated using a variety of methods to convert mobile device geolocation data into freight movement data, tag the freight movement data, and store the tagged data. For example, various methods of identification, characterization, and/or storage can be implemented to accomplish the particular tasks in the process of converting mobile device geolocation data into a freight movement database, according to various embodiments described herein.

Given the probabilistic nature of the methods described herein, the order and specification of the steps can be modified to accomplish essentially the same result. There may, for example, be feedback loops between several of the steps performed. For example, for the construction and/or maintenance of a freight movement database, once freight movement data are known to correspond to the mobile device of a freight vehicle operator from a particular freight delivery company, subsequent identifications of places of interest can be improved. For example, a position that is reverse geocoded to an address next door to the freight delivery company can be corrected to the company's address based on the association with the known freight vehicle operator.

Benefits of the systems and methods described herein include (i) overcoming the current lack of freight movement data in the marketplace; (ii) improving the understanding of freight movements both historically and in substantially real-time by updating the database continuously, resulting in the ability to measure changes in production, inventory, and sales for different companies, throughout industries, and across geographic regions (e.g., locally, e.g., nationally, e.g., internationally); (iii) satisfying financial markets that require alternative data sources for investment planning; and (iv) generating insights, for a company, into the freight movements and corresponding business trends of competitors.

In one aspect, the present disclosure is directed to a method of constructing and/or maintaining a freight movement database (e.g., a load record database) from mobile device geolocation data [e.g., wherein the mobile device geolocation data comprise (i) telecommunications data (e.g., position data from triangulated telecommunication signals), (ii) GPS geolocation data (e.g., position data from GPS chips in mobile devices), and/or (iii) WIFI location data (e.g., position data from known locations of WIFI spots) and are recorded over time (e.g. wherein geolocation data are sequentially recorded, e.g., by a smart phone app, e.g., by an SDK, e.g., by an operating system)]. The method comprises: identifying, by a processor of a computing device, a subset of (equal in size or smaller than) a collection of mobile device geolocation data for a plurality of mobile devices as freight vehicle operator data (FVOD) (e.g., using one or more heuristics and/or an artificial intelligence module), wherein the FVOD corresponds to mobile device geolocation data for mobile devices associated with (e.g., owned by) freight vehicle operators; identifying, by the processor, a subset of (equal in size or smaller than) the FVOD as freight movement data (e.g., using one or more heuristics and/or an artificial intelligence module), wherein the freight movement data corresponds to movements of freight [e.g., corresponds to movements of a mobile device that are characteristic of the movement of a freight vehicle operator moving freight but are not characteristic of other activities (e.g., off-duty activities, activities between movements, or the like)]; tagging, by the processor, the freight movement data with searchable load characteristics (e.g., searchable load characteristics such as origin arrival time, origin departure time, origin address, origin business, origin business sub-industry, destination arrival time, destination departure time, destination address, destination business, destination business sub-industry, intermediate stop arrival time, intermediate stop departure time, intermediate stop address, intermediate stop business, intermediate stop business sub-industry, carrier type, carrier company, and/or inferred contents descriptors) (e.g., using one or more heuristics and/or an artificial intelligence module); and storing, by the processor, the tagged freight movement data in a freight movement database (FMD).

In certain embodiments, the mobile device geolocation data comprise (i) telecommunications data (e.g., position data from triangulated telecommunication signals), (ii) GPS geolocation data (e.g., position data from GPS chip in a mobile device), and/or (iii) WIFI location data (e.g., position data from known location(s) of WIFI spot(s)) and/or the mobile device geolocation data are sequentially recorded from a mobile device (e.g., from a smart phone app, e.g., from an SDK, e.g., from an operating system).

In certain embodiments, the method comprises receiving, by the processor, the mobile device geolocation data as an update and storing the mobile device geolocation data in an existing database.

In certain embodiments, the step of storing the freight movement data in the freight movement database is performed in real time (e.g., on a continual basis, e.g., at regular intervals of time, e.g., hourly, e.g., daily, e.g., weekly).

In certain embodiments, the mobile device geolocation data are received as one or more data streams from one or more providers of mobile device geolocation data from a source, wherein the source is a member selected from the group consisting of one or more smart phone applications (apps), one or more software development kits (SDKs), and one or more operating systems.

In certain embodiments, the method comprises identifying a time of travel, a distance of travel, a speed of travel, and/or routes of travel (e.g., wherein timestamped position data corresponding to a road network is used to identify time, distance, speed, and/or routes of vehicle travel).

In certain embodiments, the method comprises determining time periods of vehicle operation from the time of travel, the distance of travel, and/or the speed of travel (e.g., calculating time periods of vehicle operation from serial timestamped position data from the mobile device geolocation data).

In certain embodiments, the method comprises determining whether the mobile devices associated with freight vehicle operators stop at one or more predetermined places of interest (e.g., motor carrier facilities, e.g., shipper warehouses, e.g., truck stops, e.g., railheads, e.g., airports, e.g., retail stores) using one or more methods selected from the group consisting of: (i) converting position information from the mobile device geolocation data to one or more addresses using reverse geocoding and determining whether the one or more addresses correspond to a predetermined place of interest (e.g., using information available in one or more external databases, e.g., public and/or private database(s)); (ii) using a proximity of a position of the mobile device to a predetermined place of interest; and/or (iii) determining whether the position of the mobile device is within a geofenced boundary associated with a predetermined place of interest.

In certain embodiments, identifying a subset of (equal in size or smaller than) the collection of mobile device geolocation data for a plurality of mobile devices as FVOD comprises applying one or more heuristics and/or artificial intelligence modules to one or more members selected from the group consisting of: (i) an amount of time (e.g., a number of minutes or hours) and/or a distance traveled in a given interval of time (e.g., each day, e.g., each week, e.g., each month), (ii) a pattern of an amount of time and/or a distance traveled in a given time interval, (iii) one or more patterns of geographic and/or temporal regularity and/or irregularity of movements in a given time interval, (iv) a frequency and/or timing of stops at predetermined places of interest in a given time interval, and (v) a determination of whether a starting position, an ending position, and/or intermediary stop(s) are associated with one or more predetermined places of interest (e.g., business locations).

In certain embodiments, the method comprises partitioning the FVOD by operator type (e.g., truckload drivers, e.g., sleeper teams, e.g., less-than-truckload drivers, e.g., package company drivers, e.g., drayage drivers, e.g., specialty carrier drivers, e.g., household goods drivers, e.g., refrigerated carrier drivers, e.g., motor vehicle carrier drivers, e.g., private line-haul drivers, e.g., private delivery drivers); and tagging the FVOD and/or the partitioned FVOD with operator characteristics (e.g., the number of hours and/or distance traveled by road each week, e.g., the pattern of road travel times and/or distances each week, e.g., the patterns of geographic and/or temporal regularity or irregularity of movements, e.g., the frequency and/or timing of stops at predetermined places of interest associated with movements, e.g., the businesses located at the beginning, at the end, and/or at intermediary stops of movements) representative of each operator type [e.g., truckload drivers (e.g., with irregular movement patterns, e.g., with long distance and highway movements, e.g., with movements covering multiple days, e.g., with movements beginning and ending at shipping facilities {e.g., warehouses, plants}, e.g., with stops at rest areas and/or truck stops, e.g., with stops at truck stops during nights, e.g., with periodic stops at trucking company facilities), 2-person sleeper teams (e.g., with approximately constant long distance movements, e.g., with few stops, e.g., with movements covering multiple days e.g., with periodic stops at trucking company facilities), less than truckload drivers (e.g., with movements between LTL company facilities, e.g., with regular movements and stops, e.g., with movements that begin and end each day at a LTL company facility), pickup and/or delivery drivers (e.g., with irregular stops and movements, e.g., with movements that begin and end each day at a company facility, e.g., with movements primarily on work days), package company drivers (e.g., UPS drivers, FedEx drivers, USPS drivers, DHL drivers, e.g., with irregular stops, e.g., with irregular movements e.g., with movements that begin and end each day at a package company facility, e.g., with movements primarily on work days, e.g., with frequent brief stops and movements), drayage drivers (e.g., with relatively short movements with an origin at an ocean port, intermodal facility, port of entry, or the like and a destination at a relatively nearby rail ramp, warehouse, plant, or the like, e.g., with movements that may correspond to regular routes, e.g., with movements that begin and end each day at a company facility), specialty carrier drivers (e.g., driver of a refrigerated truck, e.g., driver of a flatbed truck, e.g., driver of a truck for transporting one or more motor vehicles, e.g., driver of a truck for transporting household goods, e.g., wherein the specialty carrier drivers are identified by an origin and a destination of each movement), private line-haul drivers (e.g., with movements between company facilities, e.g., with regular movements and stops, e.g., with movements that begin and end each day at a company facility), private delivery drivers (e.g., with movements between company facilities, e.g., with regular movements and stops, e.g., with movements that begin and end each day at a company facility)].

In certain embodiments, the method comprises identifying professional vehicle operator data (PVOD) [e.g., data of other professional drivers other than freight vehicle operators (e.g., livery drivers, e.g., bus drivers)] using one or more heuristics and/or artificial intelligence modules applied to one or more members selected from the group consisting of: (i) an amount of time (e.g., a number of minutes or hours) and/or a distance traveled in a given interval of time (e.g., each day, e.g., each week, e.g., each month), (ii) a pattern of an amount of time and/or a distance traveled in a given time interval, (iii) one or more patterns of geographic and/or temporal regularity and/or irregularity of movements in a given time interval, (iv) a frequency and/or timing of stops at predetermined places of interest in a given time interval, and (v) a determination of whether a starting position, an ending position, and/or intermediary stop(s) are associated with one or more predetermined places of interest (e.g., business locations), and (vi) a frequency and/or pattern of stops at positions associated with residences in a given time interval.

In certain embodiments, the method comprises partitioning the professional vehicle operator data (PVOD) by professional operator type [e.g., livery service drivers (e.g., taxi drivers, e.g., contract-based livery drivers, e.g., private livery service drivers), e.g., bus drivers (e.g., school bus drivers, e.g., city bus drivers, e.g., inter-city bus drivers)]; and tagging the PVOD and/or the partitioned professional vehicle operator data (PVOD) with operator characteristics [e.g., the number of hours and/or distance traveled by road each week, e.g., the pattern of road travel times and/or distances, e.g., the patterns of geographic and/or temporal regularity or irregularity of movements, e.g., the frequency and/or timing of stops at predetermined places of interest associated with driver movements (e.g., airports, e.g., train stations, e.g., hotels, e.g., schools), e.g., the businesses located at the beginning, at the end, and/or at intermediary stops of movements, e.g., the frequency of and patterns of residential stops during movements] representative of each operator type [e.g., private livery service drivers (e.g., with non-recurring movements, e.g., with regular stops at different locations, e.g., with frequent stops at airports, train stations, hotels, and the like, e.g., with short duration movements, e.g., with frequent stops to residential locations), e.g., contract-based livery drivers (e.g., with similar characteristics to those of private service livery drivers but with shorter and more irregular work hours), e.g., taxi drivers (e.g., with similar characteristics to those of private livery drivers but with a higher probability of stopping at taxi company facilities), e.g., school bus drivers (e.g., with movements on regular routes at regular frequency, e.g., with movements at times that correspond to before the start of school and after the end of school, e.g., with movements primarily on school days, e.g. with movements ending at schools in the morning and beginning with schools in the afternoon, e.g., with multiple morning and afternoon movements for different schools {e.g., elementary school, e.g., middle school, e.g., high school}), e.g., city bus drivers (e.g., with movements on regular routes at regular frequency, e.g., with movements between city bus stops, e.g., with movements that follow published bus routes), e.g., inter-city bus drivers (e.g., with movements between city bus stations, e.g., with routes that follow published inter-city bus routes)].

In certain embodiments, the method comprises identifying operator characteristics, wherein the operator characteristics comprise one or more of the following: (i) driver type, (ii) company, (iii) weekly hours driven, (iv) weekly miles driven, and (v) regular routes driven.

In certain embodiments, the method further comprising partitioning the FVOD into on-duty and off-duty data using one or more heuristics and/or artificial intelligence modules applied to one or more members selected from the group consisting of: (i) patterns of movement regularity by time and/day of the week and/or date (e.g., time of day, e.g., day of week, e.g., holiday(s)), (ii) patterns of road travel route(s), road travel time(s) and/or road travel distance(s), (iii) patterns of geographic and temporal regularity and/or irregularity of movements; (iv) the operator characteristics (e.g. driver type, e.g., company); (v) a frequency and/or timing of stops at predetermined places of interest associated with an operator characteristic (e.g., a driver type); (vi) a determination of whether a starting position, an ending position, and/or intermediary stop(s) are associated with one or more predetermined places of interest (e.g., business locations); (vii) a frequency and/or pattern of stops by the mobile device at positions associated with residences, (viii) a determination of whether movements begin at, end at, or include any locations from a predetermined list associated with a home of a driver, (ix) a predetermined list of rules and/or laws governing professional drivers (e.g., rules governing on-duty hours and limiting driving hours of professional drivers).

In certain embodiments, the method comprises identifying freight movements (e.g., origin arrival time, origin departure time, origin address, destination arrival time, destination departure time, destination address, and for each intermediate stop, stop arrival time, stop departure time, stop address) from the FVOD using one or more heuristics and/or artificial intelligence modules applied to one or more members selected from the group consisting of: (i) the on-duty time and/or off-duty time of the driver; (ii) the operator characteristics (e.g., driver type, e.g., company, e.g., regular routes); (iii) starting, ending, and/or intermediary stops at predetermined places of interest associated with a driver type and/or a company (e.g., warehouses, e.g., plants, e.g., company facilities, e.g., intermodal facility); (iv) a determination of an efficiency of a movement (e.g., the presence or absence of efficient routing and timing between potential beginning and ending places for a movement); (v) a set of predetermined characteristics associated with stops and/or movements based on a driver type and/or a company; (vi) a proximity of a business to stops and/or a determination of a probability that said stops correspond to a starting, ending, or intermediary position based on a driver type; and (vii) a determination of a probability that movements are performed in an absence of freight (e.g., that a truck is empty) based on the operator characteristics (e.g., short movements may correspond to travel to pick up a next load of freight, e.g. less-than-truckload line-haul movements tend to have partial loads rather than empty movements to address imbalances, e.g., package companies pickup and delivery loads start and end at the same facility and do not have empty movements).

In certain embodiments, the load characteristics comprise one or more members selected from the group consisting of origin arrival time, origin departure time, origin address, origin business, origin business sub-industry, destination arrival time, destination departure time, destination address, destination business, destination business sub-industry, intermediate stop arrival time, intermediate stop departure time, intermediate stop address, intermediate stop business, intermediate stop business sub-industry, carrier type, carrier company, and inferred contents descriptors.

In certain embodiments, the method comprises identifying, based on the tagged freight movement data, one or more members selected from the group consisting of driver arrival times, driver arrival locations, driver departure times, driver departure locations, and visits to one or more places of interest.

In certain embodiments, the method further comprises recording, counting, aggregating, and/or summarizing the driver arrival location, driver departure times, driver departure locations, and/or visits to one or more places of interest.

In one aspect, the present disclosure is directed to a method of operating a freight movement data management platform for characterizing and/or analyzing mobile device geolocation data [e.g., wherein mobile device geolocation data comprise (i) telecommunications data (e.g., position data from triangulated telecommunication signals), (ii) GPS geolocation data (e.g., position data from GPS chips in mobile devices), and/or (iii) WIFI location data (e.g., position data from known locations of WIFI spots) and are recorded over time (e.g. wherein geolocation data are sequentially recorded, e.g., by a smart phone app, e.g., by an SDK, e.g., by an operating system)]. The method comprises providing access to a tagged subset of mobile device geolocation data for a plurality of mobile devices. The tagged subset of mobile device geolocation data: (a) are derived (e.g. directly and/or indirectly) from mobile device geolocation data via the freight movement data management platform; (b) are identified (e.g., using one or more heuristics and/or an artificial intelligence module) as being associated with (e.g., owned by) freight vehicle operators and as corresponding to loaded freight movement; and (c) comprise searchable load characteristics (e.g., wherein the searchable load characteristics are determined using one or more heuristics and/or an artificial intelligence module, e.g., wherein the searchable load characteristics comprise one or more members selected from the group consisting of origin arrival time, origin departure time, origin address, origin business, origin business sub-industry, destination arrival time, destination departure time, destination address, destination business, destination business sub-industry, intermediate stop arrival time, intermediate stop departure time, intermediate stop address, intermediate stop business, intermediate stop business sub-industry, carrier type, carrier company, and inferred contents descriptors); responsive to receipt of a search request (e.g., the search request comprising an alphanumeric string and/or a selection of a graphical user interface widget), retrieving, by a processor of the freight movement data management platform (e.g., a processor of a computing device, e.g., a device on a network), a result data set selected and/or derived from the tagged subset of mobile device geolocation data; and causing, by the processor of the freight movement data management platform, the result data set to be displayed (e.g., rendering a graphical representation of the result data set) and/or stored in memory.

In certain embodiments, the mobile device geolocation data comprise (i) telecommunications data (e.g., position data from triangulated telecommunication signals), (ii) GPS geolocation data (e.g., position data from GPS chip in a mobile device), and/or (iii) WIFI location data (e.g., position data from known location(s) of WIFI spot(s)).

In certain embodiments, the mobile device geolocation data are received as one or more data streams from one or more providers of mobile device geolocation data from a source, wherein the source is a member selected from the group consisting of one or more smart phone applications (apps), one or more software development kits (SDKs), and one or more operating systems.

In certain embodiments, the mobile device geolocation data are sequentially recorded from a mobile device (e.g., from a smart phone app, e.g., from an SDK, e.g., from an operating system).

In certain embodiments, the result data set comprises a time of travel, a distance of travel, a speed of travel, and/or routes of travel (e.g., wherein timestamped position data corresponding to a road network is used to identify time, distance, speed, and/or routes of vehicle travel).

In certain embodiments, the result data set comprises time periods of vehicle operation, a distance of travel, and/or a speed of travel.

In certain embodiments, the result data set comprises a probability that one or more of the plurality of mobile devices stop at one or more predetermined places of interest (e.g., motor carrier facilities, e.g., shipper warehouses, e.g., truck stops, e.g., railheads, e.g., airports, e.g., retail stores). The probability is determined using one or more methods selected from the group consisting of: (i) converting position information from the mobile device geolocation data to one or more addresses using reverse geocoding and determining whether the one or more addresses correspond to a predetermined place of interest (e.g., using information available in one or more external databases, e.g., public and/or private database(s)); (ii) using a proximity of a position of the mobile device to a predetermined place of interest; and/or (iii) determining whether the position of the mobile device is within a geofenced boundary associated with a predetermined place of interest.

In certain embodiments, the method comprises identifying a subset of (equal in size or smaller than) the tagged subset of mobile device geolocation data as FVOD by applying one or more heuristics and/or artificial intelligence modules to one or more members selected from the group consisting of: (i) an amount of time (e.g., a number of minutes or hours) and/or a distance traveled in a given interval of time (e.g., each day, e.g., each week, e.g., each month), (ii) a pattern of an amount of time and/or a distance traveled in a given time interval, (iii) one or more patterns of geographic and/or temporal regularity and/or irregularity of movements in a given time interval, (iv) a frequency and/or timing of stops at predetermined places of interest in a given time interval, and (v) a determination of whether a starting position, an ending position, and/or intermediary stop(s) are associated with one or more predetermined places of interest (e.g., business locations).

In certain embodiments, the method comprises identifying a subset of (equal in size or smaller than) the tagged subset of mobile device geolocation data as professional vehicle operator data (PVOD) [e.g., data of other professional drivers other than freight vehicle operators (e.g., livery drivers, e.g., bus drivers)] using one or more heuristics and/or artificial intelligence modules applied to one or more members selected from the group consisting of: (i) an amount of time (e.g., a number of minutes or hours) and/or a distance traveled in a given interval of time (e.g., each day, e.g., each week, e.g., each month), (ii) a pattern of an amount of time and/or a distance traveled in a given time interval, (iii) one or more patterns of geographic and/or temporal regularity and/or irregularity of movements in a given time interval, (iv) a frequency and/or timing of stops at predetermined places of interest in a given time interval, and (v) a determination of whether a starting position, an ending position, and/or intermediary stop(s) are associated with one or more predetermined places of interest (e.g., business locations), and (vi) a frequency and/or pattern of stops at positions associated with residences in a given time interval.

In certain embodiments, the result data set comprises operator characteristics, wherein the operator characteristics comprise one or more of the following: (i) driver type, (ii) company, (iii) weekly hours driven, (iv) weekly miles driven, and (v) regular routes driven.

In certain embodiments, the result data set comprises one or more members selected from the group consisting of origin arrival time, origin departure time, origin address, origin business, origin business sub-industry, destination arrival time, destination departure time, destination address, destination business, destination business sub-industry, intermediate stop arrival time, intermediate stop departure time, intermediate stop address, intermediate stop business, intermediate stop business sub-industry, carrier type, carrier company, inferred contents descriptors, a driver arrival time, a driver arrival location, a driver departure time, a driver departure location, and a visit to a predetermined place of interest.

In one aspect, the present disclosure is directed to a freight movement data management platform comprising: a processor of a computing device; and a memory. The memory stores instructions that, when executed by the processor, cause the processor to: (i) identify a subset of (equal in size or smaller than) a collection of mobile device geolocation data for a plurality of mobile devices as freight vehicle operator data (FVOD) using one or more heuristics and/or an artificial intelligence module, wherein the FVOD corresponds to mobile device geolocation data for mobile devices associated with (e.g., owned by) freight vehicle operators; (ii) identify a subset of (equal in size or smaller than) the FVOD as freight movement data using one or more heuristics and/or an artificial intelligence module, wherein the freight movement data corresponds to movements of freight [e.g., corresponds to movements of a mobile device that are characteristic of the movement of a freight vehicle operator moving freight but are not characteristic of other activities (e.g., off-duty activities, activities between movements, or the like)]; (iii) tag the freight movement data with searchable load characteristics (e.g., searchable load characteristics such as origin arrival time, origin departure time, origin address, origin business, origin business sub-industry, destination arrival time, destination departure time, destination address, destination business, destination business sub-industry, intermediate stop arrival time, intermediate stop departure time, intermediate stop address, intermediate stop business, intermediate stop business sub-industry, carrier type, carrier company, and/or inferred contents descriptors) using one or more heuristics and/or an artificial intelligence module; and (iv) store, in the memory, the tagged freight movement data as a freight movement database (FMD).

BRIEF DESCRIPTION OF THE FIGURES

The foregoing and other objects, aspects, features, and advantages of the present disclosure will become more apparent and better understood by referring to the following description taken in conjunction with the accompanying drawings, in which:

FIG. 9 is a block flow diagram showing a method 900 of operating a freight movement data management platform, according to an illustrative embodiment.

FIG. 10 is a block diagram of a freight movement data management platform 1000, according to an illustrative embodiment.

Figure 1:
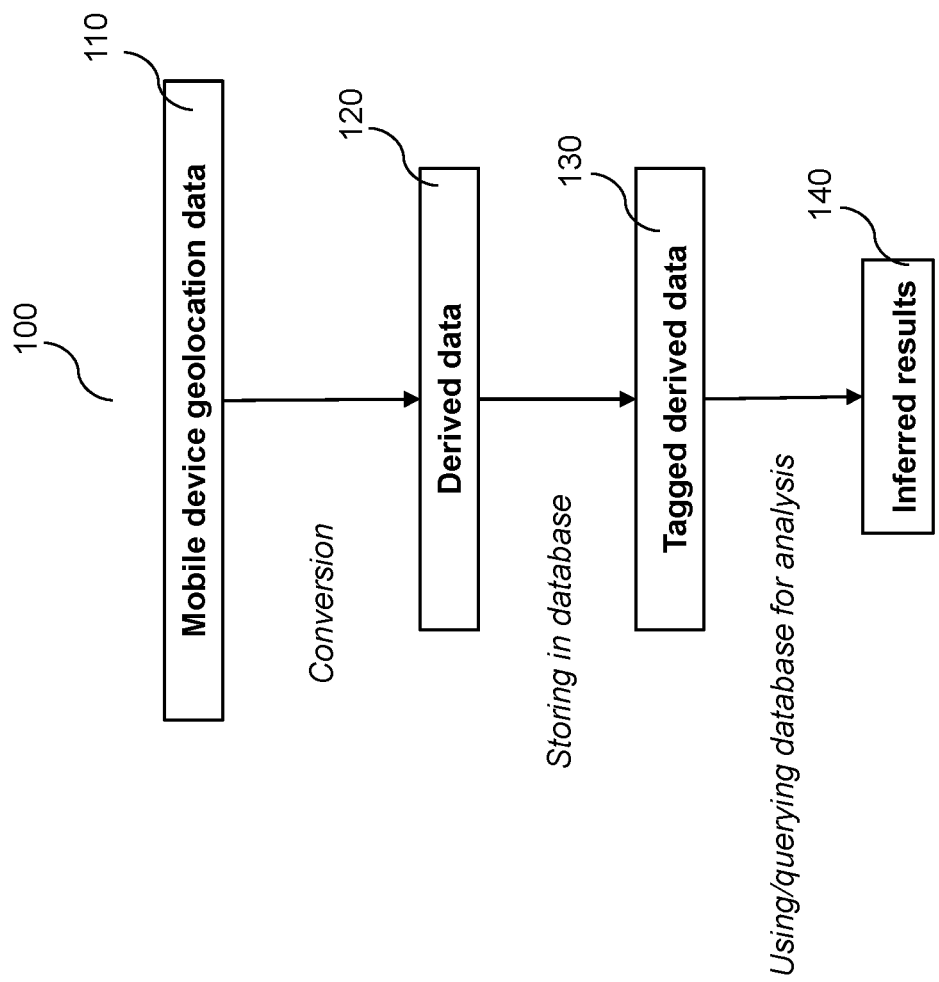
FIG. 1 is a block-flow diagram of a method 100 for inferring results 140 from mobile device geolocation data 110, according to an illustrative embodiment.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DEFINITIONS

Freight movement data: As used herein, the term "freight movement data" refers to mobile device geolocation data (e.g., processed or unprocessed) that are associated with the movement of freight by one or more freight vehicle operators. For example, "freight movement data" may correspond to movements of a mobile device that are characteristic of the movement of a freight vehicle operator that is moving freight but are not characteristic of other activities (e.g., off-duty activities, activities between movements, or the like).

Freight movement database: As used herein, the term "freight movement database" refers to a database (e.g., stored in the memory of a computing device) that includes tagged freight movement data.

Geofence: As used herein, the term "geofence" refers to the use of a predetermined geographic boundary (e.g., a virtual perimeter) to define an area near known geographic locations (e.g., businesses). For example, a "geofenced area" may be demarcated by a perimeter expressed as a series of coordinates (e.g., latitude and longitude coordinates). A "geofenced area" may be specified by a proximity to a point (e.g., the coordinates of a location) or by an area (e.g., demarcated by a circle, ellipse, polygon, or the like), which may be around or near a point.

Geotrack: As used herein, the term "geotrack" refers to a set of {timestamp, position (e.g., (latitude, longitude))} data for a given unique device identifier (UID). In certain embodiments, each geotrack may be ordered by timestamp. In certain embodiments, other positional coordinate(s) are used instead of (or in addition to) latitude and longitude. In certain embodiments, a geotrack may include additional information such as UID type, source identifier, a device type, an accuracy, and/or similar information.

Location, Position: As used herein, the terms "location" and "position" often refer to a {latitude, longitude} pair. In certain embodiments, other positional coordinate(s) are used to define a "location" or "position" instead of (or in addition to) latitude and longitude. In certain embodiments, a "location" and "position" refer to a particular place such as a business or place of residence without specifying geographic coordinates (e.g., a {latitude, longitude} pair).

Mobile device geolocation data: As used herein, the term "mobile device geolocation data" refers to location data for one or more mobile devices. "Mobile device geolocation data" may include telecommunications data (e.g., position data from triangulated telecommunication signals, e.g., from cellular phone towers), GPS geolocation data (e.g., position data from a GPS chip in a mobile device), and/or WIFI location data (e.g., position data from known location(s) of WIFI spot(s)). In certain embodiments, "mobile device geolocation data" are sequentially recorded over time by a smart phone app, a software development kit (SDK), an operating system, or the like. "Mobile device geolocation data" may be received as one or more data streams from one or more providers of mobile device geolocation data (e.g., a data broker, e.g., a telecommunications company, e.g., a technology company).

Movement identifier (MID): As used herein, the term "Movement identifier (MID)" refers to a unique identifier assigned to each movement associated with a UID.

Movement: As used herein, the term "movement" refers to a record of a translocation of a mobile device (or a corresponding user, or a corresponding freight vehicle). Each movement includes a place identifier (PID), an arrival timestamp, and a departure timestamp. In certain embodiments, a movement may refer to the set of {MID, start timestamp, start Place, end timestamp, end Place}.

Movement Sequence: As used herein the term "movement sequence" refers to a sequence of movements corresponding to the translocation of a mobile device over time. Each movement sequence corresponds to a unique device identifier (UID) and includes multiple movements associated with that UID.

Place identifier (PID): As used herein, the term "place identifier (PID)" refers to a unique identifier given to each of a subset of (equal in size or smaller than) the places of interest (POIs). In certain embodiments, a PID is a formatted address. In certain embodiments, a PID is uniquely associated with an address (e.g., via a lookup table, e.g., via a hash, e.g., via other mathematical or other transformations).

Place of interest (POI): As used herein, the term "place of interest (POI)" refers to a location identified using one or more heuristics and/or one or more artificial intelligence modules. For example, a POI may be a location where a device remains within a specified radius for a specified duration of time. For example, the device may remain with 30 feet (ft), 100 ft, or 500 ft of specified coordinates (e.g., associated with a business) for 5 minutes (min), 15 min, 30 min, 1 hour (h), 2 h, 6 h, 8 h, 12 h, or the like. For example, a POI may be a location within a specified distance of a predetermined place of interest (e.g., a location of a business, e.g., a location of residence). For example, a POI may be a location within a predetermined geofenced area.

Predetermined place of interest: As used herein, the term "predetermined place of interest" refers to a location known to correspond to a potential POI. For example, a "predetermined place of interest" may be the location of a business, a residence, or the like. In certain embodiments, predetermined places of interest may be looked up in one or more databases and/or stored as a predefined list.

Professional vehicle operator data (PVOD): As used herein, the term "professional vehicle operator data (PVOD)" refers to mobile device geolocation that is associated with the mobile devices of professional vehicle operators. Professional vehicle operators include persons who operate vehicles for pay. Professional vehicle operators do not necessarily transport freight. For example, professional vehicle operators include livery service drivers, bus drivers, and the like.

Reverse Geocoding: As used herein, the term "reverse geocoding" means converting a position (e.g., a {latitude, longitude} pair) to an address. In certain embodiments, reverse geocoding may be performed using private and/or commercially available tools and/or a combination thereof. In certain embodiments, reverse geocoding may consolidate slightly different {latitude, longitude} pairs to a single address and/or use information available in one or more private and/or public databases.

Stop: As used herein, the term "stop" refers to a record of a mobile device (or a corresponding user, or a corresponding freight vehicle, or a corresponding freight vehicle operator) remaining stationary or within a predefined area for at least a predetermined duration of time. For example, the predefined area may be within 20 ft, 100 ft, or 500 ft of a POI or a predetermined place of interest. For example, the predetermined duration of time may be 5 min, 15 min, 30 min, 1 h, 2 h, 6 h, 8 h, 12 h, or the like. Each stop includes a PID, an arrival timestamp, and a departure timestamp. In certain embodiments, a stop may refer to the set of (stop identifier, place identifier, start timestamp, end timestamp).

Stop identifier (SID): As used herein, the term "stop identifier (SID)" refers to a unique identifier assigned to each stop associated with a UID.

Stop Sequence: As used herein, the term "stop sequence" refers to a sequence of stops corresponding to a mobile device (or a corresponding user, or a corresponding freight vehicle, or a corresponding freight vehicle operator). Each stop sequence corresponds to a unique device identifier (UID) and includes multiple stops associated with that UID.

Tagging, tagged: As used herein, the terms "tagging" and "tagged" refer to the association of additional descriptive information to an entry in a database. For example, an identifier (e.g., a UID, a MID, a PID, a SID) may be tagged with corresponding characteristics. In certain embodiments, a "tag" associated with a given identifier may be stored directly in a database or as a link to additional information.

Timestamp: As used herein, the term "timestamp" refers to a numerical or textual representation that identifies when data were obtained, recorded, transferred, or the like. For example, a timestamp may be a uniquely specified date and time. For example, a "timestamped" data set may include a "timestamp" for each of a set of sequential data points.

Unique device identifier (UID): As used herein, the term "unique device identifier (UID)" refers to a unique identifier assigned to a collection of mobile device geolocation data associated with a mobile device (or a corresponding user, or a corresponding freight vehicle, or a corresponding freight vehicle operator). In certain embodiments, the raw geolocation data include UIDs. In certain embodiments, UIDs are replaced with an alternative unique device identifier. For example, an alternative unique device identifier may include a combination of and/or a transformation of a UID, a stream identifier, and/or other information.

User: As used herein, the term "user" generally refers to an individual carrying, operating, or owning a mobile device. In certain embodiments, "user" can also refer to an individual accessing an embodiment of the freight movement database described herein. In certain embodiments, "user" can also refer to an individual operating an embodiment of the freight movement data management platform.

DETAILED DESCRIPTION

It is contemplated that systems, architectures, platforms, devices, methods, and processes of the claimed invention encompass variations and adaptations developed using information from the embodiments described herein. Adaptation and/or modification of the systems, architectures, platforms, devices, methods, and processes described herein may be performed, as contemplated by this description.

Throughout the description, where articles, devices, systems, platforms, and architectures are described as having, including, or comprising specific components, or where processes and methods are described as having, including, or comprising specific steps, it is contemplated that, additionally, there are articles, devices, systems, platforms, and architectures of the present invention that consist essentially of, or consist of, the recited components, and that there are processes and methods according to the present invention that consist essentially of, or consist of, the recited processing steps.

It should be understood that the order of steps or order for performing certain action is immaterial so long as the invention remains operable. Moreover, two or more steps or actions may be conducted simultaneously. It should also be understood that not all steps described herein are required for the invention to remain operable.

The mention herein of any publication, for example, in the Background section, is not an admission that the publication serves as prior art with respect to any of the claims presented herein. The Background section is presented for purposes of clarity and is not meant as a description of prior art with respect to any claim.

Headers are provided for the convenience of the reader—the presence and/or placement of a header is not intended to limit the scope of the subject matter described herein.

The present disclosure encompasses the recognition that a broad range of information about mobile device movement(s) and/or freight movement(s) may be inferred from mobile device GPS data, for example, because of its high positional accuracy (e.g., as compared to other forms of location data). For example, FIG. 1 shows an illustrative example of a method 100 for converting mobile device geolocation data 110 into derived data 120, tagging that derived data 130, and inferring results 140. For example, inferred results may pertain to the movements of mobile devices to and/or from businesses, the movement of freight across a region or nation, the professions of device owners, the activities of device owners, or the like.

Example 1 of Constructing a Freight Movement Database

As described previously, mobile device geolocation data may include a unique device identifier (UID) along with a sequence of device positions (e.g., latitude and longitude pairs), each with a corresponding timestamp. While supplemental data may be included and can be helpful for data cleaning and pattern matching, it is not necessary and is not used here for describing an illustrative example of the database construction process. It should be understood, however, that the methods and systems described herein may also be used with mobile device geolocation data that includes such supplemental data.

Figure 2:
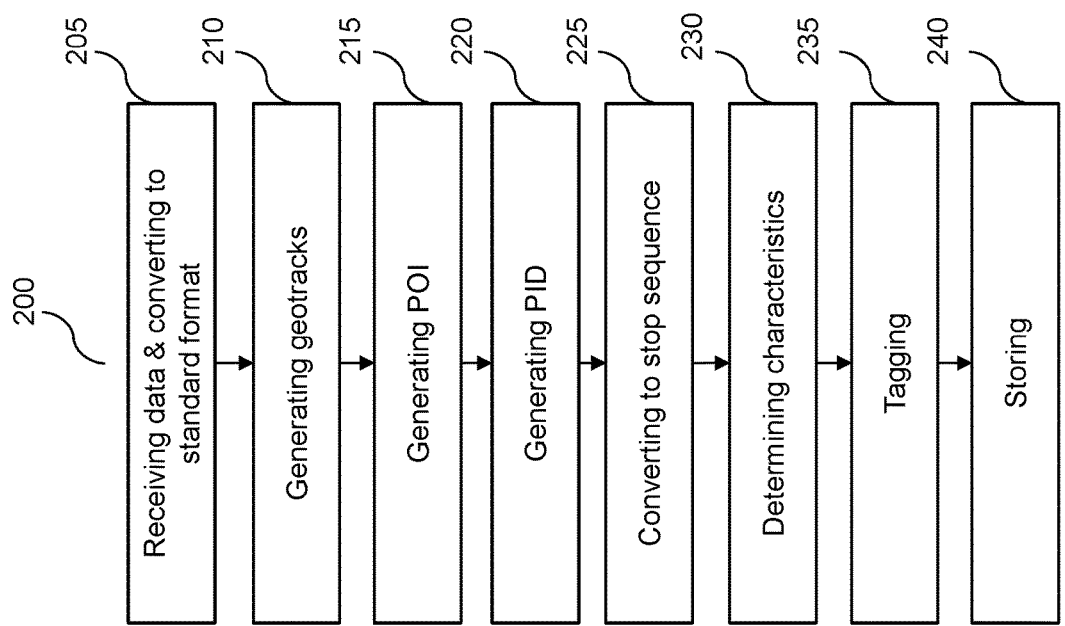
FIG. 2 is a block-flow diagram showing a method 200 for constructing and/or maintaining a freight movement database using mobile device geolocation data, according to an illustrative embodiment.

FIG. 2 shows an illustrative example of a method 200 for constructing and/or maintaining (e.g., updating) a freight movement database from geolocation data. In step 205, mobile device geolocation data are received by the processor of a computing device and converted into a standard format, thereby producing formatted position data. The mobile device geolocation data may be received on a continual or intermittent basis.

Figure 8:
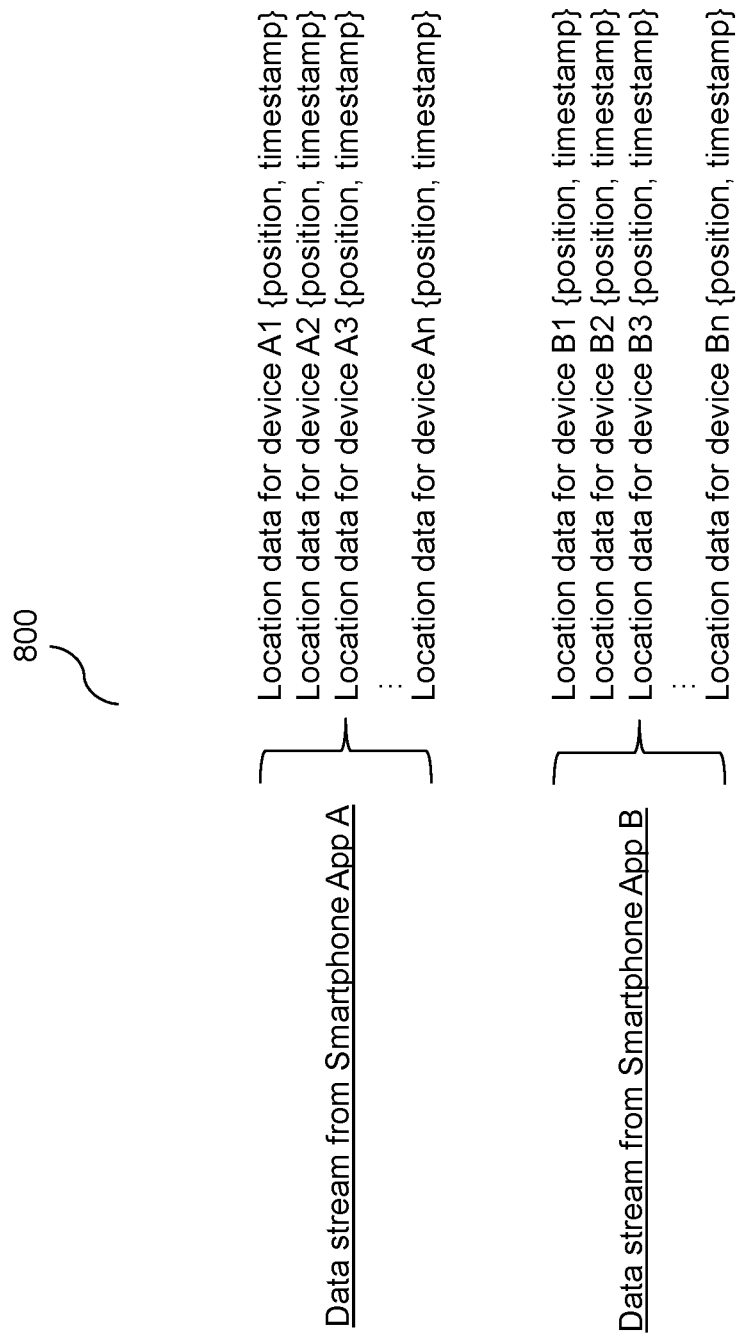
FIG. 8 is a diagram 800 of example data streams, according to an illustrative embodiment.

In certain embodiments, the mobile device geolocation data are received as one or more data streams. For example, different data streams may be associated with different providers of mobile device geolocation data. In certain embodiments, the providers may be associated with particular data sources such as smart phone applications (apps), software development kits (SDKs), or operating systems. FIG. 8 shows an illustrative example 800 of two different data streams that are associated with example smartphone applications A and B. In this illustrative example, each stream contains location data for a plurality of devices (e.g., device A1, A2, A3, etc. for App A and devices B1, B2, B3, etc. for App B).

If the mobile device geolocation data is not received in a preferred standard format, it may be converted to this format (e.g., converted to formatted position data). However, no converting is necessary if the one or more received data streams are already formatted appropriately. In certain embodiments, the formatted position data include (i) a data stream identifier for each data stream, (ii) a unique device identifier (UID) corresponding to each mobile device associated with the data stream, (iii) a sequence of positions corresponding to each UID, and (iv) a timestamp corresponding to each position.

In step 210, a geotrack is created for each mobile device of the subset based on the formatted position data of step 205 and each UID. Each geotrack comprises (i) the unique device identifier (UID) corresponding to the mobile device, (ii) a sequence of positions corresponding to the UID, and (iii) a timestamp corresponding to each position. In other words, the geotrack of a UID may include the collection of {timestamp, latitude, longitude} records ordered by timestamp for the given UID.

In step 215, places of interest (POIs) are determined for a subset of (equal in size or smaller than) the geotracks of step 210 using one or more heuristics and/or one or more artificial intelligence modules (e.g., using machine learning or neural network techniques to analyze each geotrack, e.g., using information available in one or more public and/or private database(s)). For example, a POI may be a location where a device remained within a specified radius for a specified duration of time. For example, a POI may be a location within a specified distance of a predetermined place of interest. For example, a POI may be a location within a predetermined set of geofenced areas or the like.

It should be understood from the description above that a POI may be any location of interest in a geotrack. In certain embodiments, POIs are locations where the user has a stop of a meaningful duration or at pre-identified places of interest. POIs may be automatically identified from tracking a location history associated with each UID. For example, a heuristic used to determine POIs may include a determination of whether a mobile device associated with a UID has remained within a 50-yard radius of a location for at least 15 minutes. Of course, more complex heuristics may produce improved results. For example, a dynamic proximity filter may be used depending on supplemental data that may be available, for example, related to location type or accuracy. For example, the proximity threshold to a location may be larger (e.g., larger than a 50-yard radius) in rural locations and smaller in urban locations. Minimum durations may be set shorter for known locations of high interest such as businesses or truck terminals.

In certain embodiments, POIs are generated directly from geotracks. However, other POIs may be predetermined (i.e., predetermined places of interest) as locations of high interest and may be specified exogenously (e.g., using geofences). For example, geofences can be specified by proximity to a point or by the explicit specification of a polygon or other shape. For example, by providing explicit boundaries from satellite imaging or other means, a determination of a location that a mobile device visits as a POI may be enhanced. For example, by defining a large truck terminal covering several buildings and many acres of land using a geofenced area, a determination of a mobile device entering and/or departing from the facility may be significantly enhanced compared to when simple automatic heuristics are used. In certain embodiments, accurate and explicit geofenced areas for predetermined places of high interest are provided to improve the generation of POIs.

In step 220, a place identifier (PID) is generated corresponding to each of a subset of (equal in size or smaller than) the POIs generated in step 215. In certain embodiments, PIDs are generated by first determining an address for each POI by reverse geocoding the latitude and a longitude of the POI. POIs described, for example, by {latitude, longitude} pairs may be less useful than addresses generating PIDs. Consequently, {latitude, longitude} pairs may be converted to addresses using reverse geocoding. For example, a commercially available reverse geocoding tool and/or service may be used to determine the addresses of POIs. In certain embodiments, reverse geocoding also consolidates slightly different {latitude, longitude} pairs to a single address. Reverse geocoding may include, for example, looking up addresses of predetermined places of interest that correspond to the latitudes and longitudes of the POIs. Reverse geocoding may include, for example, looking up addresses corresponding to the latitudes and longitudes of the POIs in a predetermined set of geofenced areas.

In certain embodiments, the determined addresses are then converted into a standard (e.g., repeatable) format to generate a PID. For example, the address can be used as the PID, or the address can be transformed into a PID (e.g. by hashing the address, e.g. by using a mathematical function or other transformation to convert the address to a number or a fixed length string, e.g., a string with a fixed number of characters).

Still referring to method 200 shown in FIG. 2, to identify mobile device stops and, optionally, movements, each geotrack from step 210 is converted into a stop sequence, which includes multiple stops at POIs and, optionally, movements between these stops (step 225). While geotracks include, for example, a series of timestamps and locations associated with a UID, stop sequences include a series of stops associated with a UID and represent a subset of all of the locations in a geotrack. Each stop in a stop sequence may include, for example, a PID, an arrival timestamp, and a departure timestamp. For example, for each of the geotracks, a set of one or more stops and/or one or more movements may be determined from a set of PIDs and associated timestamps for a corresponding UID. In other words, a stop sequence may, in certain embodiments, be considered as a simplified version of the geotrack used to construct it. For example, a stop sequence may include a subset of the information stored in the geotrack from which it is determined.

Each stop may be given a unique stop identifier (SID). A stop may then include the combination of {SID, UID, PID, start timestamp, ending timestamp}. Similarly, each movement may be given a unique movement identifier (MID), and a movement may then include the combination of {MID, UID, start PID, start timestamp, end PID, end timestamp}. The use of UIDs, PIDs, SIDs, and MIDs allow connections to be maintained and exploited between users, POIs, stops, and movements.

In step 230, characteristics are determined for places, stops, movements, and users for each stop sequence. These characteristics provide insight into a user of a mobile (or a corresponding freight vehicle, or a corresponding freight vehicle operator) including the places he/she visits, the activities he/she performs, and the movements he/she makes.

Place Characteristics

Using the address of a place as a key, multiple characteristics can be determined and tagged to the place by querying commercially and publicly available databases. For example, a database may be queried to determine whether the place is residential, commercial, industrial, government, or mixed use. If the place is commercial or industrial, a database may be queried to determine what business is located at the address. A database may be queried to determine with which sub-industry, industry, and/or business sector the business is associated. If the location is residential, a database may be queried to determine whether it is a single-family house, a multi-family house, an apartment building, or a condominium complex. A database may be queried to determine the characteristics of the neighborhood (e.g., urban, suburban, or rural) (e.g., average income level of residents). Information from these database queries may be stored in the freight movement database (in step 240) as tags or links to external databases.

Places are not necessarily user specific. However, places may have different meanings for different users. For example, a place of residence and a place of primary occupation are specific to a user. The meaning of a place for a given user may be determined, for example, from the frequency and/or timing of stops at that place. Frequency and/or timing of stops may also allow customers to be differentiated as either new, infrequent, or repeat customers. PIDs associated with specific user may be determined by analyzing patterns of stops in stop sequences that are associated with a specific UID and PID pair. Additional characteristics may be inferred from these characteristics. For example, PIDs corresponding to the location where a user spends a majority of his/her time may be of high interest.

In certain embodiments, the primary residence of a user is identified. Most users spend a majority (e.g., 95% or greater, e.g., 90% or greater, e.g., 75% or greater, e.g. 50% or greater) of their nights at their primary residence. For example, stop sequences which have stops at a single residential location most evenings follow this pattern. Some users may have a secondary significant residential location (e.g., where they spend 5% or more of their nights). Identified frequent residences for users can be tagged with residential characteristics such as frequency of stops and residence type (e.g., primary residence, secondary residence, seasonal residence, vacation residence, school residence, or the like). For many residential locations, the cost of the residence can be determined from available databases, providing information about the socioeconomic status of the user.

Some users work evening or night shifts, resulting in a shift in the times spent at a primary residence. In certain embodiments, these residences are determined by modifying the heuristic used for determining a place of residence because a large amount of time is still spent at the residential location. For example, these residences may be determined based on the duration and/or frequency of stops at a residential location during daytime hours. For some users, a primary residence may not be determined.

For most users, an occupation-related location is associated with a business. For some users, an occupation-related location may be identified using a similar approach to that used to identify their primary residence. For example, occupation-related locations may be readily identified based on the frequency and time spent at a location for users who work regular schedules in a single non-residential location. However, there some users do not work in regular locations and/or at regular frequencies or times. For example, construction workers, repair workers, pilots, drivers, household cleaners, landscapers, or the like may work in irregular locations and/or for irregular intervals of time. For these users, occupation-related locations may be identified through other patterns in their corresponding stop sequence. For example, the patterns may be analyzed using an artificial intelligence module.

Stop Characteristics

As described herein, a stop may include the set of {UID, PID, start timestamp, ending timestamp}. During stop characterization, aspects of the activity or purpose associated with a stop by a given user are inferred. Activities can be user, place, or time dependent. For example, if a user visits a restaurant one time arriving at 11:45 am local time and departing at 1:00 pm local time, the activity of the stop may be inferred to have been eating lunch, and the user may have been a customer of the restaurant. However, if another user stops at the same restaurant 5 or 6 days each week and remains at the restaurant for 6 to 10 hours, for each stop, the activity may be work, and the user is likely a full-time employee of the restaurant.

Identifying commercial activity may be of high interest. Commercial activity occurs both when users are working and consuming products or services. When an occupation-related location is identified for a user, stops at other non-residential locations may be characterized more accurately (e.g., because they are known to not be occupation-related). Similarly, when the occupation of a user is inferred, activity identification and/or characterization may be improved. For example, if the primary work location of a user is in a medical office building, periodic visits to a nearby hospital are likely work related, especially if the previous or following stop is at the known primary work location. However, stops at the same hospital after normal business hours that are associated with a movement that start and end at a primary residence is likely to be a visit for a personal or familial medical need. Stop characterization can be performed iteratively such that more and better inferences are made in each iteration.

Movement Characteristics

As described above, a movement may include the set of {MID, UID, start PID, start timestamp, end PID, end timestamp}. The movement may be generated from a subsequence of a geotrack starting with a departure from a start PID at a starting time and ending at an end PID at an ending time. This subsequence of the geotrack corresponds to the path of the movement.

A primary movement characteristic is the mode of transportation that is associated with the movements. In certain embodiments, mode of transportation is determined by combining information about the path of the movement and the speed of the movement. For example, the movement distance can be estimated from the path of the movement. For example, this distance may be longer than the straight-line distance between the stopping and ending locations. This distance may be combined with the duration of the movement to estimate the average movement speed. The speed may also be calculated for sub-segments of a movement. In addition to speed, starting place, ending place, and path may be used to identify a mode of transportation. A movement that begins and ends at airports with an average travel speed of 320 mph and no intermediate stops is likely airline travel. A movement with a travel speed of 2.2 mph starting and ending at a primary residence is likely a walk. A movement with an average travel speed of 32 mph with peak speeds of 45 mph and a path that follows major roads is likely motor vehicle travel. A movement with average speeds of 15 mph that follows major roads is likely bicycle travel. A movement starting from a primary work location at 2.2 mph to a train station, where there is a 10-minute stop, followed by an average travel speed of 36 mph to another train station, leading to a movement of 0.2 miles at 2 mph followed by 6 miles at 27 mph to a primary residence is likely a commute home for a user which includes walking to the train, taking the train to another station, walking to a car, and driving home.

Mode of transportation may be determined by evaluating patterns of stops and movements in each stop sequence. Analysis can be performed using one or more heuristics or using an artificial intelligence module (e.g., a deep learning neural network). Movement characteristics can include inferences about a movement's purpose can be made based on the time of movement, origin and destination of the movement, user characteristics, mode of transportation, and/or the like. Examples of such characterizations include commuting, shopping, dining, vacation travel, and the like.

User Characteristics

From the patterns of places, stops, and movements, it is possible to determine user characteristics. For example, an occupation-related location (or place of employment) is a type of user characteristic, as described previously. User characteristics may include a determination of whether a user has an identifiable workplace. If a workplace is identified, additional inferences may be made about the user's profession and other secondary characteristics such as socio-economic status.

Returning again to FIG. 2, the UIDs, PIDs, and stop sequences are tagged with the user, place, and/or stop characteristics in step 235. It should be understood that as places, stops, movements, and users are characterized and tagged, collectively they may provide additional information for characterizing other places, stops, movements, and users or improving said characterizations. Consequently, improved iterative rules for place identification and/or characterization may be used based on the information inferred about stops, movements, and users. For example, once a user is identified as a professional driver based on the methods described herein and a movement is tagged as a freight movement, short stops may be flagged for evaluation (e.g., manual or automatic evaluation) to determine if they are associated with pickup or delivery locations, which may be retained as new POIs.

In step 240, the tagged UIDs, tagged PIDs, and tagged stop sequences are stored in a memory of the computing device to create and/or update the freight movement database.

Preserving Anonymity

In certain embodiments, the movement database is constructed and/or maintained in a manner that preserves and/or improves anonymity of the users of the mobile devices. For example, the present disclosure encompasses a recognition that the UID of each geotrack can potentially be de-anonymized. Although mobile device geolocation data typically does not contain information about each device's user, prior to being sold, one might cross-reference each geotrack (e.g., after reverse geocoding) against numerous publicly available databases to potentially identify the personal identity of the owner of each device. For example, users may be identified based on the places visited and the timing of those visits (e.g., if a device spends most nights at a residential address, public information could be used to identify the residents of that address).

There are many ethical, legal, and contractual reasons to preserve anonymity when working with geolocation data. As such, in certain embodiments, steps may be taken to protect the anonymity of the user as information about the user is inferred (e.g. storing sensitive information in separate databases, e.g. encrypting data, e.g. hashing addresses, e.g. the use of unidirectional links and transformations, e.g. not storing data from intermediate steps in final database).

Example 2 of Constructing and/or Maintaining a Freight Movement Database

In certain embodiments, users, places, stops, and movements are identified to create a database of freight movements (a freight movement database). In order to create a freight movement database, it is necessary to identify freight vehicle operators. This can be accomplished by identifying specific patterns associated with different types of freight vehicle operators (e.g., truck drivers). It should be understood that different types of freight vehicle operators have significantly different patterns as do professional drivers of other types.

Figure 3:
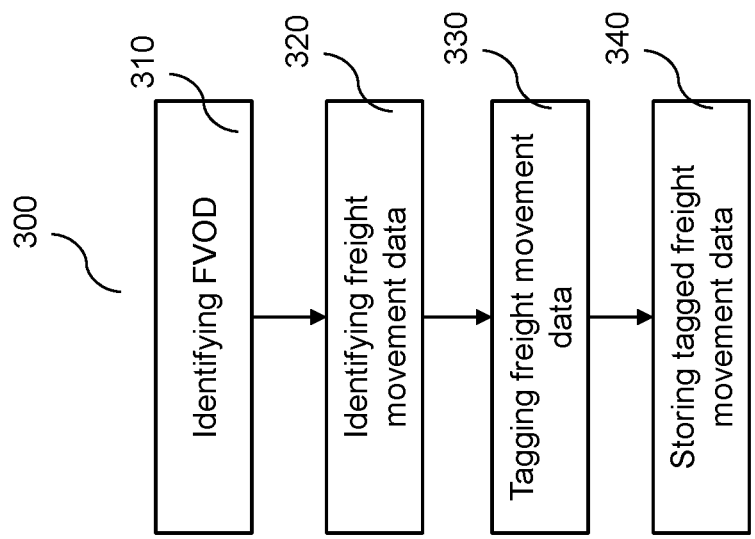
FIG. 3 is a block-flow diagram showing a method 300 of constructing and/or maintaining a freight movement database using mobile device geolocation data, according to an illustrative embodiment.

FIG. 3 shows an illustrative example of a method 300 for constructing and/or maintaining a freight movement database using mobile device geolocation data. In step 310 of method 300, the processor of a computing device identifies a subset of (equal in size or smaller than) a collection of mobile device geolocation data as freight vehicle operator data (FVOD). The FVOD correspond to mobile device geolocation data for mobile devices associated with (e.g., owned by) freight vehicle operators. For example, FVOD may be identified using one or more heuristics and/or an artificial intelligence module. For example, candidate freight vehicle operators may spend at least 20 hours on the road most every week.

Types of Drivers

There are many different types of drivers corresponding to different segments of the trucking industry. Among for-hire carriers, there are truckload carriers (TL), less-than-truckload (LTL) carriers, drayage carriers, package carriers, and specialty carriers. Approximately 50% of U.S. trucking is done by private carrier, which can involve line-haul drivers and delivery drivers. These driver types are all associated with different patterns of stops and movements. Provided below are illustrative examples of stop and movement patterns used to identify different driver types.

Livery Service Drivers: Livery service movements are non-recurring, stopping at different locations constantly. The most frequented stops are where significant numbers of people need cars such as airports, train stations, and hotels. Most movements are short distances with the longest distances frequently originating or terminating at airports. Many drivers work regular hours, but they may be non-standard hours.

Bus Drivers: School bus drivers run regular routes. The buses start and end the day at a bus company facility which typically only runs school buses. They work almost exclusively on school days and their morning routes end at schools while their afternoon routes start at schools. Typically, they have multiple morning and afternoon runs with the earlier runs for high school or middle school while the later runs are for middle school or elementary school.

City bus drivers usually also work regular routes. The buses start and end the day at locations corresponding to either a bus company or a municipal bus facility. The type of bus can be identified based on whether the location is a business or government entity. Buses tend to travel on major roads.

Intercity bus drivers may or may not travel regular routes. However, their movements are from city to city with stops at bus stations.

Truckload Drivers: Truckload drivers very rarely have regular patterns to their movements. Their movements tend to cover longer distances, frequently over multiple days. Most truckload drivers are away from home two or more weeks at a stretch. Truckload drivers usually sleep in beds in the cabs of their trucks. By law in the US, drivers may drive a maximum of 11 hours in a 14 hour stretch and only after 10 hours off-duty. Consequently, truckload drivers often have 7 or more hour stretches when they are sleeping in their trucks often at highway rest areas or truck rest stops. Loads generally begin and end at warehouses, plants, and other major shipping facilities. The truckload industry has many small and independent carriers, so company identification may not be possible for all drivers. However, drivers for major companies have periodic stops at company facilities.

There is a subset of truckload drivers called sleeper teams. A sleeper team is a paring of two drivers that share a single truck. One drives while the other rests. Sleeper teams are easily identifiable since they do not have any long rest stops to sleep, but rather can drive essentially non-stop from origin to destination. Consequently, sleeper teams are usually on multiday loads.

Less-than-truckload Drivers: Drivers in the less-than-truckload (LTL) industry fall into two general classifications: line-haul drivers who drive between company facilities versus pickup and delivery drivers. Line-haul drivers often drive regular routes. Most routes can be completed in a single duty cycle. Routes start and end at the LTL company's facilities. Pickup and delivery drivers start and end their day at an LTL facility, almost always on workdays, and typically have irregular stops throughout the day.

Package Company Drivers: The small package business is very similar to the LTL business except that parcel size is significant smaller, so there are more stops for local pickup and delivery vehicles. In the US, the package business is dominated by a small number of large corporate entities which can facilitate driver identification.

Drayage Drivers: The drayage business generally involves moving containers relatively short distances starting from ocean ports, intermodal facility, or port of entry and ending at relatively nearby rail ramps, warehouses, or plants. The driver may have one or several regular routes. Drayage drivers are principally identified by the starting points of their trips. For example, the companies of the drivers can be identified by stops at company facilities where vehicles may be stored.

Specialty Carrier Drivers: There are several types of specialty carriers who use refrigerated trucks, flatbed trucks, trucks to transport loads which include, for example, motor vehicles, household goods, and food products. These companies may be divisions of truckload carriers or their own separate companies. Specialty carrier drivers can be identified via stop analysis. For example, a driver that moves from a port or vehicle manufacturing plant to car dealerships is almost certainly a motor vehicle carrier. For example, a vehicle that moves long distances from residence to residence with ½-day to 2-day loading times is likely a household mover.

Private Line-Haul Drivers: Private line-haul drivers operate like LTL line-haul drivers except that their movements start at a single company's facilities, and the company is not a trucking company. Line-haul loads can have multiple delivery points, and delivery may be at the company facilities or at customer facilities.

Private Delivery Drivers: Private delivery drivers are generally like LTL delivery drivers except that the routes start and end at a facility for a company that is not a trucking company. Stops may be at other company facilities or at customer facilities. Drivers may have regular routes.

Returning again to FIG. 3, a subset of (equal in size or smaller than) the FVOD is identified as freight movement data in step 320 of method 300. The freight movement data corresponds to movements of freight. For example, freight movement data corresponds to movements of a mobile device that are characteristic of the movement of a freight vehicle operator moving freight but are not characteristic of other activities (e.g., off-duty activities, activities between movements, or the like). The freight movement data may be identified using one or more heuristics and/or an artificial intelligence module.

The freight movements, or loads, may be characterized. Freight movement characteristics include driver type (e.g., as categorized above) and company. In certain embodiments, however, a company is not determined (e.g., for some truckload drivers).

Freight Movement Characteristics

As described above, different driver types are associated with different movement patterns. Therefore, different patterns are used to identify the beginning and end of loaded freight movements. Freight movements may include multiple stops and movements with a single stop sequence. For example, a single freight movement may include multiple stops (e.g., for delivering or picking up freight, e.g., for breaks for eating, gassing up the truck, and/or sleeping).

When a freight movement is identified, its origin and destination place and time may be stored in the freight movement database along with the distance traveled. The businesses at the origin and destination may be identified along with their respective industry classifications. In certain embodiments, freight movements with two or more stops (e.g., delivery locations) have those stops listed and business information is subsequently captured for those stops. In certain embodiments, freight movement are classified according to the carrier type and subsequent characterization is not performed.

Freight movement characteristics may be referred to as a load record in certain embodiments. A load record may include, for example, an origin arrival timestamp, an origin departure timestamp, an origin address, an origin business, an origin business sub-industry, a destination arrival timestamp, a destination departure timestamp, a destination address, a destination business, a destination business sub-industry, a carrier type, a carrier company, inferred contents descriptors, and/or other tags.

Intermediate stop characteristics may include, for example, a stop arrival timestamp, a stop departure timestamp, a stop address, a stop business, and/or a stop business sub-industry. Example patterns of the movement of different types of freight (e.g., of different types of loads) are presented below.

Examples of Truckload Load Identification: Truckload drivers may iterate between driving loaded and deadheading (e.g., driving empty or with no trailer). This pattern is broken up both by mandated weekly 34 hours off-duty periods which must occur not later than after 60-70 hours on duty over a 7-8 day period. It is rare that the 34 hours rest occurs during a load except on weekends if a load cannot be delivered until a facility opens on a Monday. This pattern may be broken whenever drivers return home. Return trip are often deadheading. Loaded movements may move in the most efficient route while empty movements may not. This may occur because a driver drops a load but does not know the location of the his/her next load. The driver then drives to a suitable location to eat, sleep, or otherwise occupy his or her time. Freight movements are generally significantly longer than deadhead movements. The identity of facilities located at stops can be used to determine whether freight movements are loaded versus empty. Shippers tend to be higher volume than receivers. Some locations are only shippers or receivers. Finally, many facilities which are both shippers and receivers may have a temporal pattern (e.g., they receive loads in the morning and ship loads in the afternoon).

Examples of Less-than-truckload Load Identification: LTL loads may be easier to identify than truckload loads. Line-haul loads often start and end at the company facilities. Line-haul loads often follow a regular schedule. Empty movements may not be identified for LTL loads. Pickup and delivery routes typically start and end at the same LTL facility.

Examples of Package Company Load Identification: For package delivery companies, line-haul freight movements occur between known facilities including airports. Additionally, for some major shippers, there may be dedicated movements from shipper warehouses into the package delivery system. Local pickup and delivery often begin and end at known facilities associated with the package company.

Examples of Drayage Load Identification: The starting point for a drayage load is typically an ocean port, an intermodal facility, or a port of entry, and is likely the same each day for a given driver. Ending points are typically relatively nearby rail ramps, warehouses, or plants.

Examples of Other Load Identification: Load identification for specialty carriers varies by type and must be customized accordingly. Private line-haul operators may be similar to LTL line-haul drivers but may begin movements at facilities that are owned by a company that is not associated with shipping. Private deliveries typically start and end at a single non-trucking company facility.

Returning again to FIG. 3, freight movement data are tagged with searchable load characteristics in step 330 of method 300. In addition to the characteristics described previously, the searchable load characteristics may include origin arrival time, origin departure time, origin address, origin business, origin business sub-industry, destination arrival time, destination departure time, destination address, destination business, destination business sub-industry, intermediate stop arrival time, intermediate stop departure time, intermediate stop address, intermediate stop business, intermediate stop business sub-industry, carrier type, carrier company, and/or inferred contents descriptors. The tagged freight movement data are then stored in a freight movement database (FMD) in step 340 of method 300.

Operating a Freight Movement Database

FIG. 10 shows an illustrative example of a freight movement data management platform 1000, according to certain embodiments. Freight movement data management platform 1000 includes a processor 1010, a memory 1020, and a display 1030.

FIG. 9 shows an illustrative example of a method 900 of operating a freight movement data management platform, according to certain embodiments.

In step 910, a tagged subset of mobile device geolocation data may be accessed for a plurality of mobile devices. The tagged mobile device geolocation data are derived (e.g. directly and/or indirectly) from mobile device geolocation data via the freight movement data management platform, and the tagged mobile device geolocation data are identified (e.g., using one or more heuristics and/or an artificial intelligence module) as being associated with (e.g., owned by) freight vehicle operators and as corresponding to loaded freight movement.

The tagged mobile device geolocation data also include searchable load characteristics (e.g., as described previously). For example, the searchable load characteristics are determined using one or more heuristics and/or an artificial intelligence module. For example, the searchable load characteristics may include origin arrival time, origin departure time, origin address, origin business, origin business sub-industry, destination arrival time, destination departure time, destination address, destination business, destination business sub-industry, intermediate stop arrival time, intermediate stop departure time, intermediate stop address, intermediate stop business, intermediate stop business sub-industry, carrier type, carrier company, and/or inferred contents descriptors.

In step 920, a processor of the freight movement data management platform (e.g., a processor of a computing device, e.g., a device on a network) retrieves result data set selected and/or derived from the tagged subset of mobile device geolocation data in response to a search request. For example, the search request may include an alphanumeric string and/or a selection of a graphical user interface widget.

In step 930, the result data set is displayed by the processor of the freight movement data management platform or stored in a memory of the platform. For example, the result data set may be rendered as a graphical representation.

Network and Computer Implementation

Figure 4:
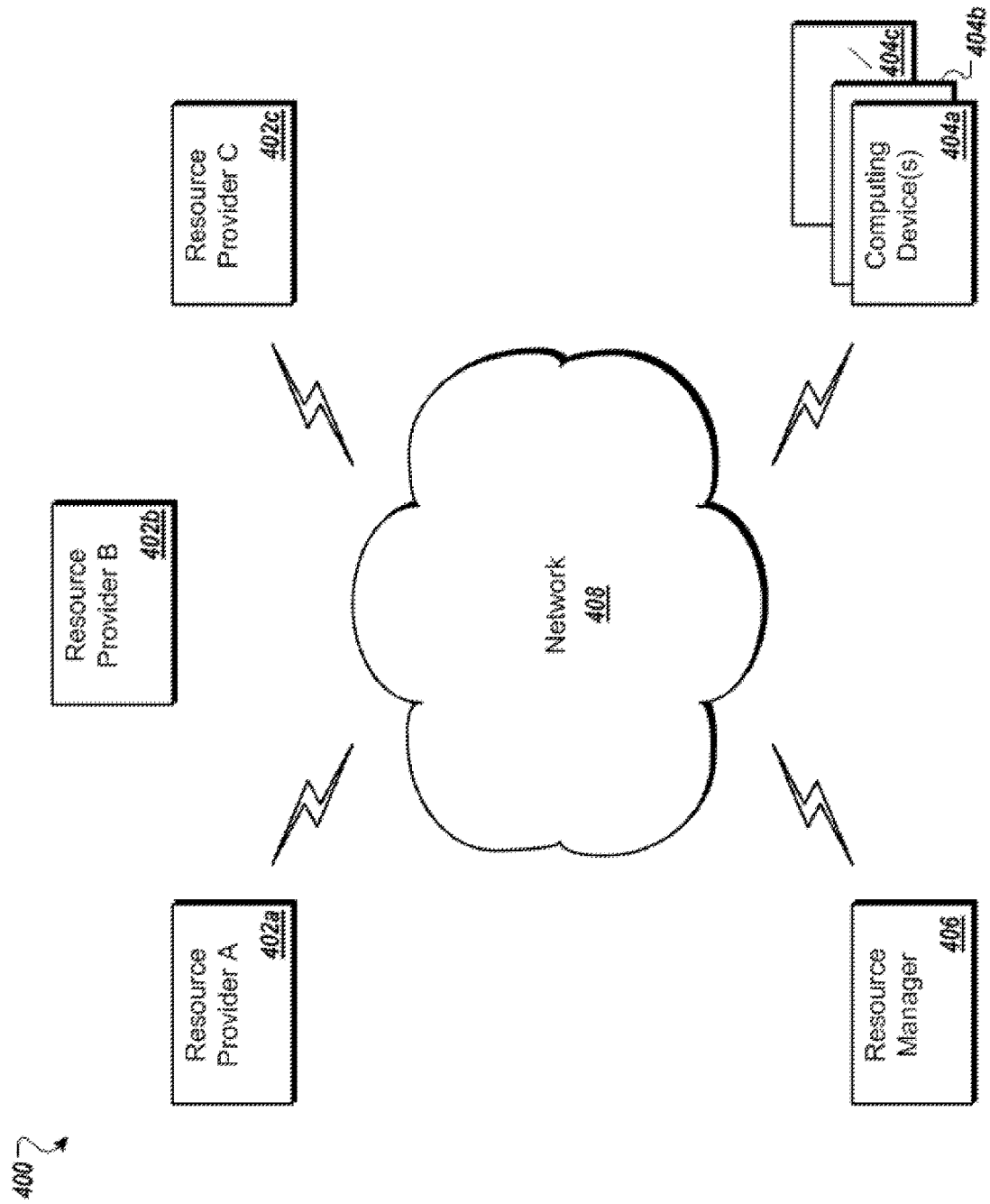
FIG. 4 is a block diagram of an exemplary cloud computing environment 400 used in certain embodiments.

An implementation of a network environment 400 for use in providing systems, methods, and software/hardware platforms described herein is shown in FIG. 4. In brief overview, referring now to FIG. 4, a block diagram of an exemplary cloud computing environment 400 is shown and described. The cloud computing environment 400 may include one or more resource providers 402a, 402b, 402c (collectively, 402). Each resource provider 402 may include computing resources. In some implementations, computing resources may include any hardware and/or software used to process data. For example, computing resources may include hardware and/or software capable of executing algorithms, computer programs, and/or computer applications. In some implementations, exemplary computing resources may include application servers and/or databases with storage and retrieval capabilities. Each resource provider 402 may be connected to any other resource provider 402 in the cloud computing environment 400. In some implementations, the resource providers 402 may be connected over a computer network 408. Each resource provider 402 may be connected to one or more computing device 404a, 404b, 404c (collectively, 404), over the computer network 408.

The cloud computing environment 400 may include a resource manager 406. The resource manager 406 may be connected to the resource providers 402 and the computing devices 404 over the computer network 408. In some implementations, the resource manager 406 may facilitate the provision of computing resources by one or more resource providers 402 to one or more computing devices 404. The resource manager 406 may receive a request for a computing resource from a particular computing device 404. The resource manager 406 may identify one or more resource providers 402 capable of providing the computing resource requested by the computing device 404. The resource manager 406 may select a resource provider 402 to provide the computing resource. The resource manager 406 may facilitate a connection between the resource provider 402 and a particular computing device 404. In some implementations, the resource manager 406 may establish a connection between a particular resource provider 402 and a particular computing device 404. In some implementations, the resource manager 406 may redirect a particular computing device 404 to a particular resource provider 402 with the requested computing resource.

Figure 5:
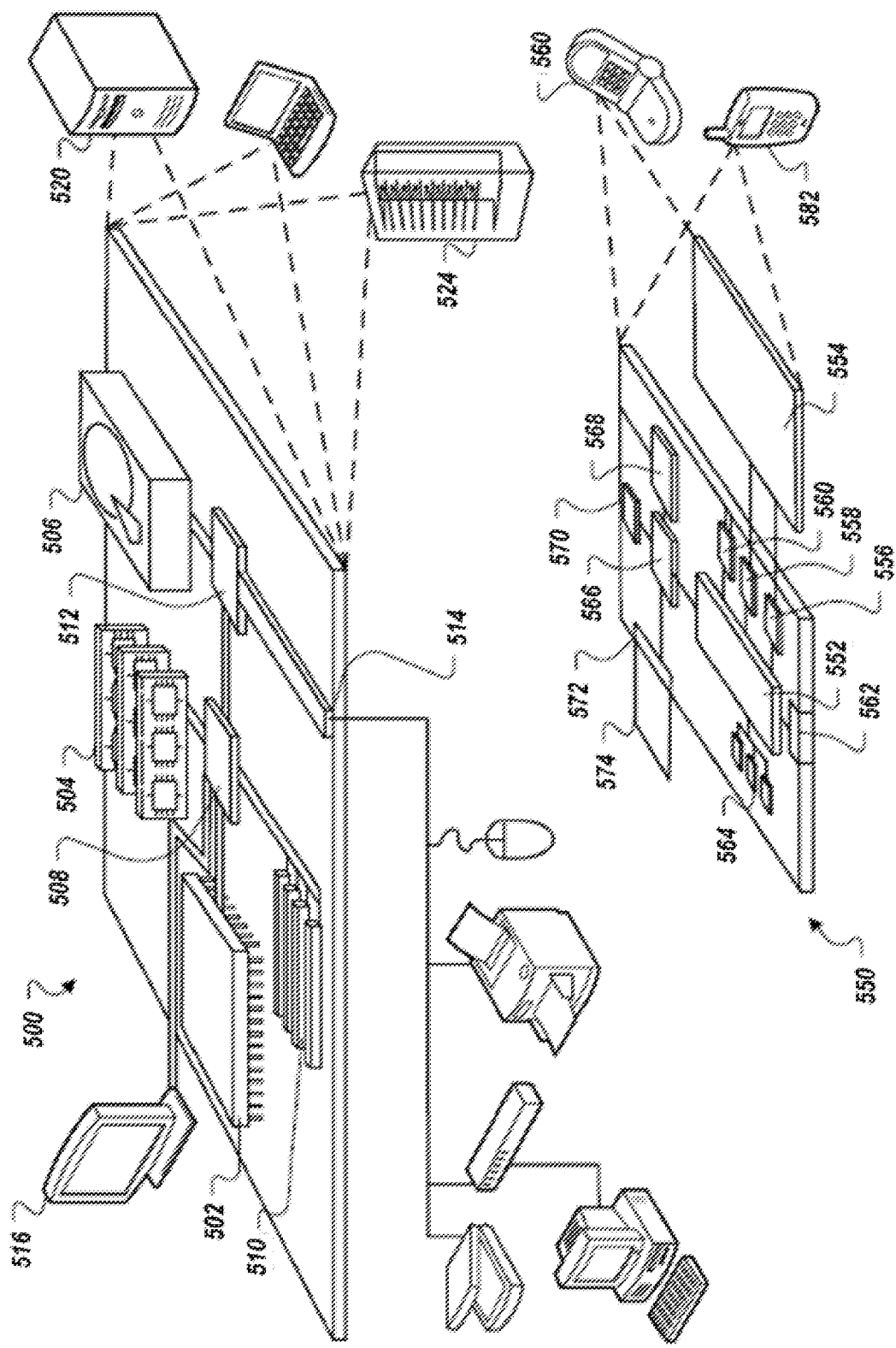
FIG. 5 is a block diagram of an example computing device 500 and an example mobile computing device 550 used in certain embodiments.
Figure 6:
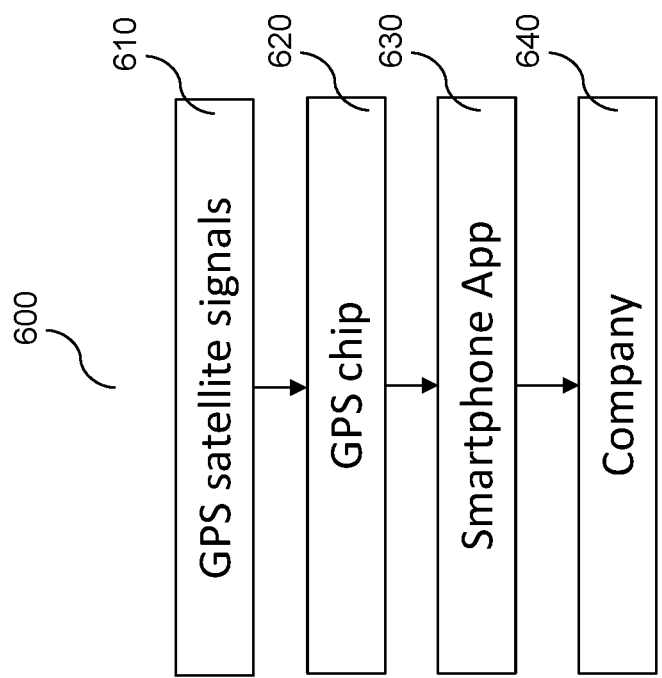
FIG. 6 is a block-flow diagram describing the flow of mobile device geolocation data from a GPS chip 620 of a mobile device to a company 640 via a smartphone application 630, according to an illustrative embodiment.
Figure 7:
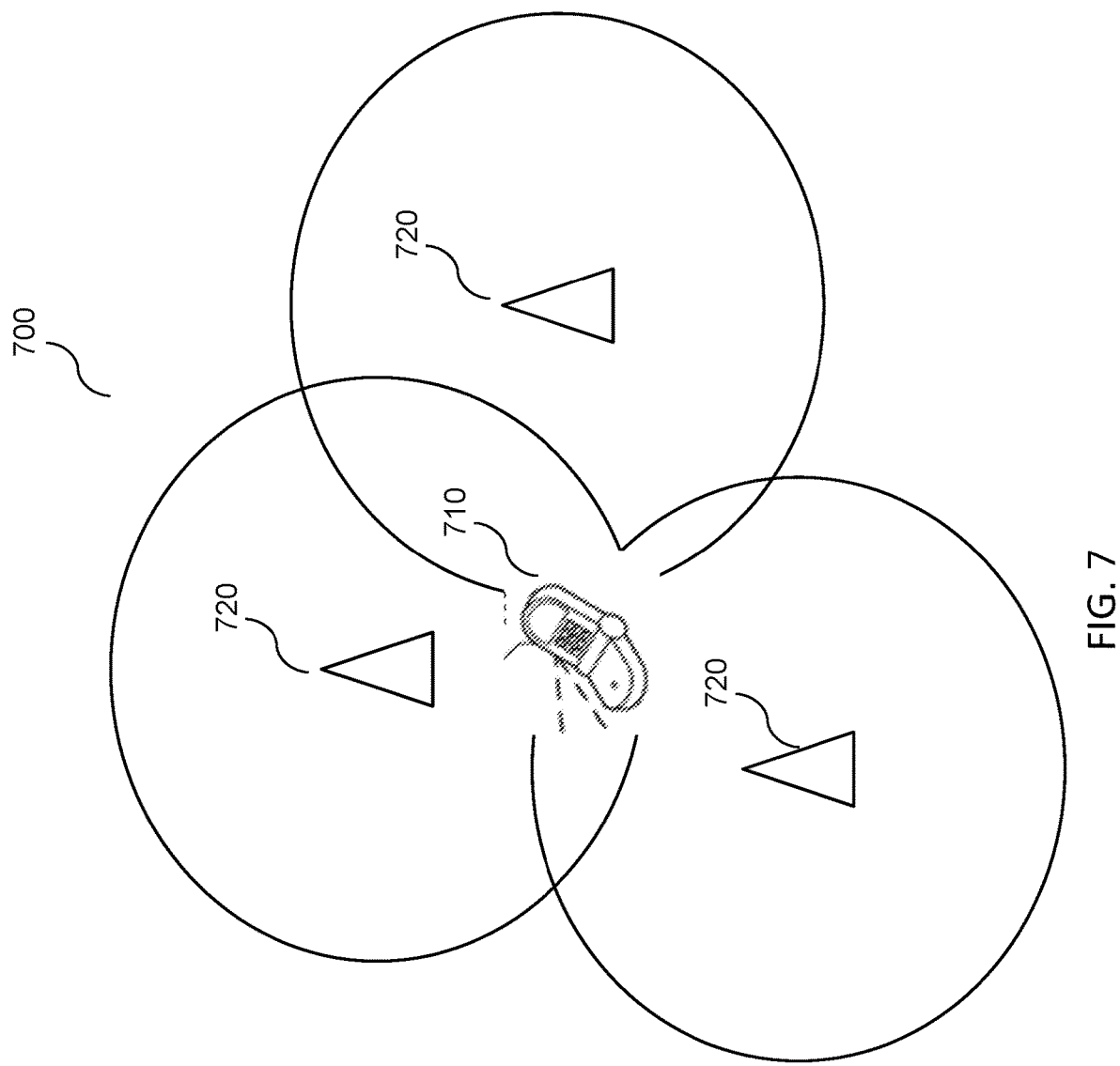
FIG. 7 is a diagram 700 representing the triangulation of cellphone position using telecommunications data, according to an illustrative embodiment.

FIG. 5 shows an example of a computing device 500 and a mobile computing device 550 that can be used to implement the techniques described in this disclosure. The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system). Thus, as the term is used herein, where a plurality of functions are described as being performed by "a processor", this encompasses embodiments wherein the plurality of functions are performed by any number of processors (one or more) of any number of computing devices (one or more). Furthermore, where a function is described as being performed by "a processor", this encompasses embodiments wherein the function is performed by any number of processors (one or more) of any number of computing devices (one or more) (e.g., in a distributed computing system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 502), perform one or more methods, such as those described above. The instructions can also be stored by one or more storage devices such as computer- or machine-readable mediums (for example, the memory 504, the storage device 506, or memory on the processor 502).

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device (not shown), such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In-line Memory Module) card interface or a DIMM (Double In-line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provide as a security module for the mobile computing device 550, and may be programmed with instructions that permit secure use of the mobile computing device 550. In addition, secure applications may be provided via the DIMM cards, along with additional information, such as placing identifying information on the DIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 552), perform one or more methods, such as those described above. The instructions can also be stored by one or more storage devices, such as one or more computer- or machine-readable mediums (for example, the memory 564, the expansion memory 574, or memory on the processor 552). In some implementations, the instructions can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth®, Wi-Fi™, or other such transceiver (not shown). In addition, a GPS (Global Positioning System) receiver module 570 (e.g., including a GPS chip) may provide navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) monitor, an LCD (liquid crystal display) monitor, or an LED (light-emitting diodes) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the functions of the instructions implemented by the processor can be characterized as modules, which can be separated, combined or incorporated into single or combined modules. The processor may be one or more pieces of hardware, and may be part of a network. The figures are not intended to limit the software architecture and/or hardware of the methods and systems described herein to specific structures.

Elements of different implementations described herein may be combined to form other implementations not specifically set forth above. Elements may be left out of the processes, computer programs, databases, etc. described herein without adversely affecting their operation. In addition, the logic flows depicted in the figures do not require the particular order shown, or sequential order, to achieve desirable results. Various separate elements may be combined into one or more individual elements to perform the functions described herein. In view of the structure, functions and apparatus of the systems and methods described here, in some implementations.

Throughout the description, where apparatus and systems are described as having, including, or comprising specific components, or where processes and methods are described as having, including, or comprising specific steps, it is contemplated that, additionally, there are apparatus, and systems of the present invention that consist essentially of, or consist of, the recited components, and that there are processes and methods according to the present invention that consist essentially of, or consist of, the recited processing steps.

It should be understood that the order of steps or order for performing certain action is immaterial so long as the invention remains operable. Moreover, two or more steps or actions may be conducted simultaneously.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method of tracking freight movement by identifying and tagging freight movement data from a subset of mobile device geolocation data recorded over time from a plurality of mobile devices, the method comprising:

receiving, by a processor of a computing device, a collection of mobile device geolocation data from mobile devices of users who have not been identified previously as freight vehicle operators, wherein the collection of mobile device geolocation data comprises global positioning system (GPS) geolocation data comprising position information for each of the plurality of mobile devices;

automatically identifying, by the processor of the computing device, a subset of the collection of mobile device geolocation data as freight vehicle operator data (FVOD) using values of derived variables corresponding, collectively, to (a) patterns of time traveled, (b) distances traveled, and (c) visits to locations of relevance to freight vehicle operations, said values derived from the mobile device geolocation data itself, wherein the FVOD corresponds to mobile device geolocation data for mobile devices associated with freight vehicle operators;

automatically identifying, by the processor, a subset of (equal in size or smaller than) the FVOD as freight movement data, wherein the freight movement data corresponds to movements of freight;

tagging, by the processor, the freight movement data with searchable lead characteristics; and storing, by the processor and tagged freight movement database (FMD).

2. The method of claim 1, wherein the mobile device geolocation data further comprise one or more members selected from the group consisting of (i) telecommunications data and (ii) WIFI location data.

3. The method of claim 1, comprising receiving, by the processor, the mobile device geolocation data as an update and storing the mobile device geolocation data in an existing database.

4. The method of claim 1, wherein the step of storing the freight movement data in the freight movement database is performed in real time.

5. The method of claim 1, wherein the mobile device geolocation data are received as one or more data streams from one or more providers of mobile device geolocation data from a source, wherein the source is a member selected from the group consisting of one or more smart phone applications (apps), one or more software development kits (SDKs), and one or more operating systems.

6. The method of claim 1, comprising determining whether the mobile devices associated with freight vehicle operators stop at one or more predetermined places of interest using one or more methods selected from the group consisting of:
(i) converting position information from the mobile device geolocation data to one or more addresses using reverse geocoding and determining whether the one or more addresses correspond to a predetermined place of interest;
(ii) using a proximity of a position of the mobile device to a predetermined place of interest; and
(iii) determining whether the position of the mobile device is within a geofenced boundary associated with a predetermined place of interest.

7. The method of claim 1, comprising:
partitioning the FVOD by operator type; and
tagging one or both members selected from the group consisting of the FVOD and the partitioned FVOD with operator characteristics representative of each operator type.

8. The method of claim 1, comprising identifying professional vehicle operator data (PVOD).

9. The method of claim 8, comprising:
partitioning the professional vehicle operator data (PVOD) by professional operator type; and
tagging one or more members selected from the group consisting of the PVOD and the partitioned PVOD with operator characteristics representative of each operator type.

10. The method of claim 1, comprising identifying operator characteristics, wherein the operator characteristics comprise one or more members selected from the group consisting of: (i) driver type, (ii) company, (iii) weekly hours driven, (iv) weekly miles driven, and (v) regular routes driven.

11. The method of claim 1, comprising partitioning the FVOD into on-duty and off-duty data using one or more members selected from the group consisting of one or more heuristics and one or more artificial intelligence modules applied to one or more members selected from the group consisting of: (i) patterns of movement regularity by time and one or more members selected from the group consisting of day of the week and date, (ii) patterns of one or more members selected from the group consisting of road travel route(s), road travel time(s) and road travel distance(s), (iii) patterns of geographic and temporal regularity of movements, (iv) patterns of geographic and temporal irregularity of movements; (v) operator characteristics; (vi) a frequency of stops at predetermined places of interest associated with one or more operator characteristics, (vii) a timing of stops at predetermined places of interest associated with one or more operator characteristics; (viii) a determination of whether one or more members selected from the group consisting of a starting position, an ending position, and intermediary stop(s) are associated with one or more predetermined places of interest; (ix) a frequency of stops by the mobile device at positions associated with residences, (x) a pattern of stops by the mobile device at positions associated with residences, (xi) a determination of whether movements begin at, end at, or include any locations from a predetermined list associated with a home of a driver, (xii) a predetermined list comprising one or more members selected from the group consisting of rules and laws governing professional drivers.

12. The method of claim 1, comprising identifying freight movements from the FVOD using one or more members selected from the group consisting of one or more heuristics and one or more artificial intelligence modules applied to one or more members selected from the group consisting of: (i) the on-duty time of a driver, (ii) the off-duty time of the driver; (iii) operator characteristics; (iv) one or more members selected from the group consisting of starting, ending, and intermediary stops at predetermined places of interest associated with a driver type, (v) one or more members selected from the group consisting of starting, ending, and intermediary stops at predetermined places of interest associated with a company; (vi) a determination of an efficiency of a movement; (vii) a set of predetermined characteristics associated with one or more members selected from the group consisting of stops and movements based on a driver type, (viii) a set of predetermined characteristics associated with one or more members selected from the group consisting of stops and movements based on a company; (ix) a proximity of a business to stops and a determination of a probability that said stops correspond to a starting, ending, or intermediary position based on a driver type; and (x) a determination of a probability that movements are performed in an absence of freight based on operator characteristics.

13. The method of claim 1, comprising identifying, based on the tagged freight movement data, one or more members selected from the group consisting of driver arrival times, driver arrival locations, driver departure times, driver departure locations, and visits to one or more places of interest.

14. The method of claim 13, further comprising performing one or more of the steps selected from the group consisting of recording, counting, aggregating, and summarizing one or more members selected from the group consisting of the driver arrival times, the driver arrival locations, the driver departure times, the driver departure locations, and the visits to one or more places of interest.

15. A method of tracking freight movement by operating a freight movement data management platform for characterizing and/or analyzing mobile device geolocation data recorded over time from a plurality of mobile devices, the method comprising:

providing access to a tagged subset of mobile device geolocation data for a plurality of mobile devices, wherein the tagged subset of mobile device geolocation data:

are derived from mobile device geolocation data of mobile devices of users who have not been identified previously as freight vehicle operators via the freight movement data management platform, wherein the mobile device geolocation data comprise global positioning system (GPS) geolocation data comprising position information for each of the plurality of mobile devices;

are identified as being associated with freight vehicle operators and as corresponding to loaded freight movement; and Comprise searchable load characteristics;

responsive to receipt of a search request, retrieving, by a processor of the freight movement data management platform, a result data set selected or derived from the tagged subset of mobile device geolocation data; and causing, by the processor of the freight movement data management platform, the result data set to be one or both of (i) and (ii) as follows: (i)displayed and (ii) stored in memory.

16. The method of claim 15, wherein the mobile device geolocation data further comprise one or more members selected from the group consisting of (i) telecommunications data and (ii) WIFI location data.

17. The method of claim 15, wherein the mobile device geolocation data are received as one or more data streams from one or more providers of mobile device geolocation data from a source, wherein the source is a member selected from the group consisting of one or more smart phone applications (apps), one or more software development kits (SDKs), and one or more operating systems.

18. The method of claim 15, wherein the mobile device geolocation data are sequentially recorded from a mobile device.

19. The method of claim 15, wherein the result data set comprises one or more members selected from the group consisting of a time of travel, a distance of travel, a speed of travel, and routes of travel.

20. The method of claim 15, wherein the result data set comprises one or more members selected from the group consisting of time periods of vehicle operation, a distance of travel, and a speed of travel.

21. The method of claim 15, wherein the result data set comprises a probability that one or more of the plurality of mobile devices stop at one or more predetermined places of interest, wherein the probability is determined using one or more methods selected from the group consisting of:
converting position information from the mobile device geolocation data to one or more addresses using reverse geocoding and determining whether the one or more addresses correspond to a predetermined place of interest;
(ii) using a proximity of a position of the mobile device to a predetermined place of interest; and
(iii) determining whether the position of the mobile device is within a geofenced boundary associated with a predetermined place of interest.

22. The method of claim 15, comprising identifying a subset of (equal in size or smaller than) the tagged subset of mobile device geolocation data as FVOD by applying one or more members selected from the group consisting of one or more heuristics and one or more artificial intelligence modules to one or more members selected from the group consisting of: (i) an amount of time traveled in a given interval of time, (ii) a distance traveled in a given interval of time, (iii) a pattern of an amount of time traveled in a given interval of time, (iv) a pattern of a distance traveled in a given interval of time, (v) one or more patterns of geographic regularity of movements in a given interval of time, (vi) one or more patterns of temporal regularity of movements in a given interval of time, (vii) one or more patterns of geographic irregularity of movements in a given interval of time, (viii) one or more patterns of temporal irregularity of movements in a given interval of time, (ix) a frequency of stops at predetermined places of interest in a given interval of time, (x) a timing of stops at predetermined places of interest in a given interval of time, and (xi) a determination of whether one or more members selected from the group consisting of a starting position, an ending position, and intermediary stop(s) are associated with one or more predetermined places of interest.

23. The method of claim 15, comprising identifying a subset of the tagged subset of mobile device geolocation data as professional vehicle operator data (PVOD) using one or more members selected from the group consisting of one or more heuristics and one or more artificial intelligence modules applied to one or more members selected from the group consisting of: (i) an amount of time traveled in a given interval of time, (ii) a distance traveled in a given interval of time, (iii) a pattern of an amount of time traveled in a given interval of time, (iv) a pattern of a distance traveled in a given interval of time, (v) one or more patterns of geographic regularity of movements in a given interval of time, (vi) one or more patterns of temporal regularity of movements in a given interval of time, (vii) one or more patterns of geographic irregularity of movements in a given interval of time, (viii) one or more patterns of temporal irregularity of movements in a given interval of time, (ix) a frequency of stops at predetermined places of interest in a given interval of time, (x) a timing of stops at predetermined places of interest in a given interval of time, (xi) a determination of whether one or more members selected from the group consisting of a starting position, an ending position, and intermediary stop(s) are associated with one or more predetermined places of interest, (xii) a frequency of stops at positions associated with residences in a given time interval, and (xiii) a pattern of stops at positions associated with residences in a given interval of time.

24. The method of claim 15, wherein the result data set comprises operator characteristics, wherein the operator characteristics comprise one or more members selected from the group consisting of: (i) driver type, (ii) company, (iii) weekly hours driven, (iv) weekly miles driven, and (v) regular routes driven.

25. The method of claim 15, wherein the result data set comprises one or more members selected from the group consisting of origin arrival time, origin departure time, origin address, origin business, origin business sub-industry, destination arrival time, destination departure time, destination address, destination business, destination business sub-industry, intermediate stop arrival time, intermediate stop departure time, intermediate stop address, intermediate stop business, intermediate stop business sub-industry, carrier type, carrier company, inferred contents descriptors, a driver arrival time, a driver arrival location, a driver departure time, a driver departure location, and a visit to a predetermined place of interest.

26. A freight movement data management platform for identifying and tagging freight movement data from a subset of mobile device geolocation data recorded over time from a plurality of mobile devices, the platform comprising:
- a processor of a computing device; and
- a memory, the memory storing instructions that, when executed by the processor, cause the processor to:
- receive a collection of mobile device geolocation data from mobile devices of users who have not been identified previously as freight vehicle operators, wherein the collection of mobile device geolocation data comprises global positioning system (GPS) geolocation data comprising position information for each of the plurality of mobile devices;
- automatically identify a subset of the collection of mobile device geolocation data as freight vehicle operator data (FVOD) using values of derived variables corresponding, collectively, to (a) patterns of time traveled, (b) distances traveled, and (c) visits to locations of relevance to freight vehicle operations, said values derived from the mobile device geolocation data itself;
- automatically identify a subset of (equal in size or smaller than) the FVOD as freight movement data movement data corresponds to movement of freight;
- tag the freight movement data with searchable load characteristics; and
- store, in the memory the tagged freight movement data as a freight movement database (FMD).

27. The method of claim 1, wherein identifying the subset of the collection of mobile device geolocation data for the plurality of mobile devices as FVOD comprises using one or more members selected from the group consisting of one or more heuristics and one or more artificial intelligence modules.

28. The method of claim 1, wherein the derived variables comprise one or more members selected from the group consisting of: (i) an amount of time traveled in a given interval of time, (ii) a distance traveled in a given interval of time, (iii) a pattern of an amount of time traveled in a given interval of time, (iv) a pattern of a distance traveled in a given interval of time, (v) one or more patterns of geographic regularity of movements in a given interval of time, (vi) one or more patterns of temporal regularity of movements in a given interval of time, (vii) one or more patterns of geographic irregularity of movements in a given time interval, (viii) one or more patterns of temporal irregularity of movements in a given interval of time, (ix) a frequency of stops at predetermined places of interest in a given time interval, (x) a timing of stops at predetermined places of interest in a given interval of time, and (xi) a determination of whether one or more members selected from the group consisting of a starting position, an ending position, and intermediary stop(s) are associated with one or more predetermined places of interest.

29. The method of claim 1, wherein the load characteristics comprise one or more members selected from the group consisting of origin arrival time, origin business, origin business sub-industry, destination departure time, destination business, destination business sub-industry, intermediate stop arrival time, intermediate stop departure time, intermediate stop address, intermediate stop business, intermediate stop business sub-industry, carrier type, carrier company, and inferred contents descriptors.

30. The method of claim 1, wherein the load characteristics comprise origin departure time, origin address, destination arrival time, and destination address.

* * * * *

UNITED STATES PATENT AND TRADEMARK OFFICE
CERTIFICATE OF CORRECTION

PATENT NO. : 10,528,604 B2  
APPLICATION NO. : 15/884175  
DATED : January 7, 2020  
INVENTOR(S) : Kenneth S. Nickerson Page 1 of 1

It is certified that error appears in the above-identified patent and that said Letters Patent is hereby corrected as shown below:

In the Claims

In Claim 1, Column 31, Line 6, delete "lead" and insert -- load --

In Claim 1, Column 31, Line 7, delete "processor and tagged freight movement database (FMD)." and insert -- processor, the tagged freight movement data in a freight movement database (FMD). --

In Claim 15, Column 33, Line 16, delete "Comprise" and insert -- comprise --

In Claim 15, Column 33, Line 23, delete "(i)displayed" and insert -- (i) displayed --

In Claim 21, Column 33, Line 52, delete "converting" and insert -- (i) converting --

In Claim 26, Column 35, Line 22, delete "the FVOD as freight movement data movement data corresponds to movement of freight;" and insert -- the FVOD as freight movement data, wherein the freight movement data corresponds to movements of freight; --

In Claim 26, Column 35, Line 26, delete "memory" and insert -- memory, --

Signed and Sealed this  
Twenty-fourth Day of March, 2020

Andrei Iancu  
*Director of the United States Patent and Trademark Office*